(12) United States Patent
Husmann

(10) Patent No.: US 8,991,561 B2
(45) Date of Patent: Mar. 31, 2015

(54) ELEVATOR BRAKING EQUIPMENT

(75) Inventor: Josef Husmann, Lucerne (CH)

(73) Assignee: Inventio AG, Hergiswil (CH)

( * ) Notice: Subject to any disclaimer, the term of this patent is extended or adjusted under 35 U.S.C. 154(b) by 488 days.

(21) Appl. No.: 13/051,465

(22) Filed: Mar. 18, 2011

(65) Prior Publication Data
US 2011/0226560 A1 Sep. 22, 2011

(30) Foreign Application Priority Data

Mar. 18, 2010 (EP) .................................... 10156865

(51) Int. Cl.
| | | |
|---|---|---|
| *B66B 5/18* | (2006.01) | |
| *B66B 5/20* | (2006.01) | |
| *F16D 63/00* | (2006.01) | |
| *F16D 65/28* | (2006.01) | |
| *F16D 121/26* | (2012.01) | |
| *F16D 125/40* | (2012.01) | |
| *F16D 125/64* | (2012.01) | |
| *F16D 127/00* | (2012.01) | |
| *F16D 129/08* | (2012.01) | |

(52) U.S. Cl.
CPC ... *B66B 5/18* (2013.01); *B66B 5/20* (2013.01); *F16D 63/008* (2013.01); *F16D 65/28* (2013.01); *F16D 2121/26* (2013.01); *F16D 2125/40* (2013.01); *F16D 2125/64* (2013.01); *F16D 2127/008* (2013.01); *F16D 2129/08* (2013.01)
USPC .............................. 187/359; 188/42; 188/72.2

(58) Field of Classification Search
CPC .............. B66B 5/18; B66B 5/12; B66B 5/20; F16D 2121/26

USPC ........... 187/368, 370, 374–375; 188/42, 72.2, 188/43
See application file for complete search history.

(56) References Cited

U.S. PATENT DOCUMENTS

| 3,182,566 | A | | 5/1965 | Berg et al. | |
|---|---|---|---|---|---|
| 5,141,081 | A | | 8/1992 | Kregel et al. | |
| 5,353,895 | A | | 10/1994 | Camack et al. | |
| 6,092,630 | A | * | 7/2000 | Wendel et al. | 187/373 |
| 7,299,898 | B2 | * | 11/2007 | Husmann | 187/373 |
| 2008/0017456 | A1 | * | 1/2008 | Ito | 187/359 |
| 2013/0081907 | A1 | * | 4/2013 | Meierhans et al. | 187/359 |
| 2013/0081908 | A1 | * | 4/2013 | Meierhans et al. | 187/359 |
| 2013/0248298 | A1 | * | 9/2013 | Osmanbasic et al. | 187/359 |

FOREIGN PATENT DOCUMENTS

| DE | 10816351 3 | 5/1960 |
|---|---|---|
| EP | 0346195 A1 | 12/1989 |

(Continued)

*Primary Examiner* — William E Dondero
*Assistant Examiner* — Diem Tran
(74) *Attorney, Agent, or Firm* — Fraser Clemens Martin & Miller LLC; William J. Clemens

(57) ABSTRACT

An elevator brake can comprise a brake shoe with a substantially curved shape, the brake shoe being rotatable in a brake shoe support. The brake shoe support is mounted in a brake housing and can be linearly displaced between a readiness setting and an engagement setting. The brake can be actuated by an actuator. The actuator can comprise a brake store for acting on the brake through a connecting point to bring the brake into its engaged setting. A force store in the actuator can be held electromagnetically, and a resetting device enables resetting of the force store and of the actuator into the operating position.

12 Claims, 16 Drawing Sheets

(56) References Cited

FOREIGN PATENT DOCUMENTS

| EP | 0488809 | A2 | 6/1992 | | |
|----|---------|----|--------|---|---|
| EP | 1067084 | A1 | 1/2001 | | |
| EP | 1733992 | A1 | 12/2006 | | |
| EP | 1902993 | A1 * | 3/2008 | | B66B 5/22 |
| EP | 2112116 | A1 | 10/2009 | | |
| EP | 2154096 | A1 | 2/2010 | | |
| GB | 2395752 | A | 6/2004 | | |

* cited by examiner

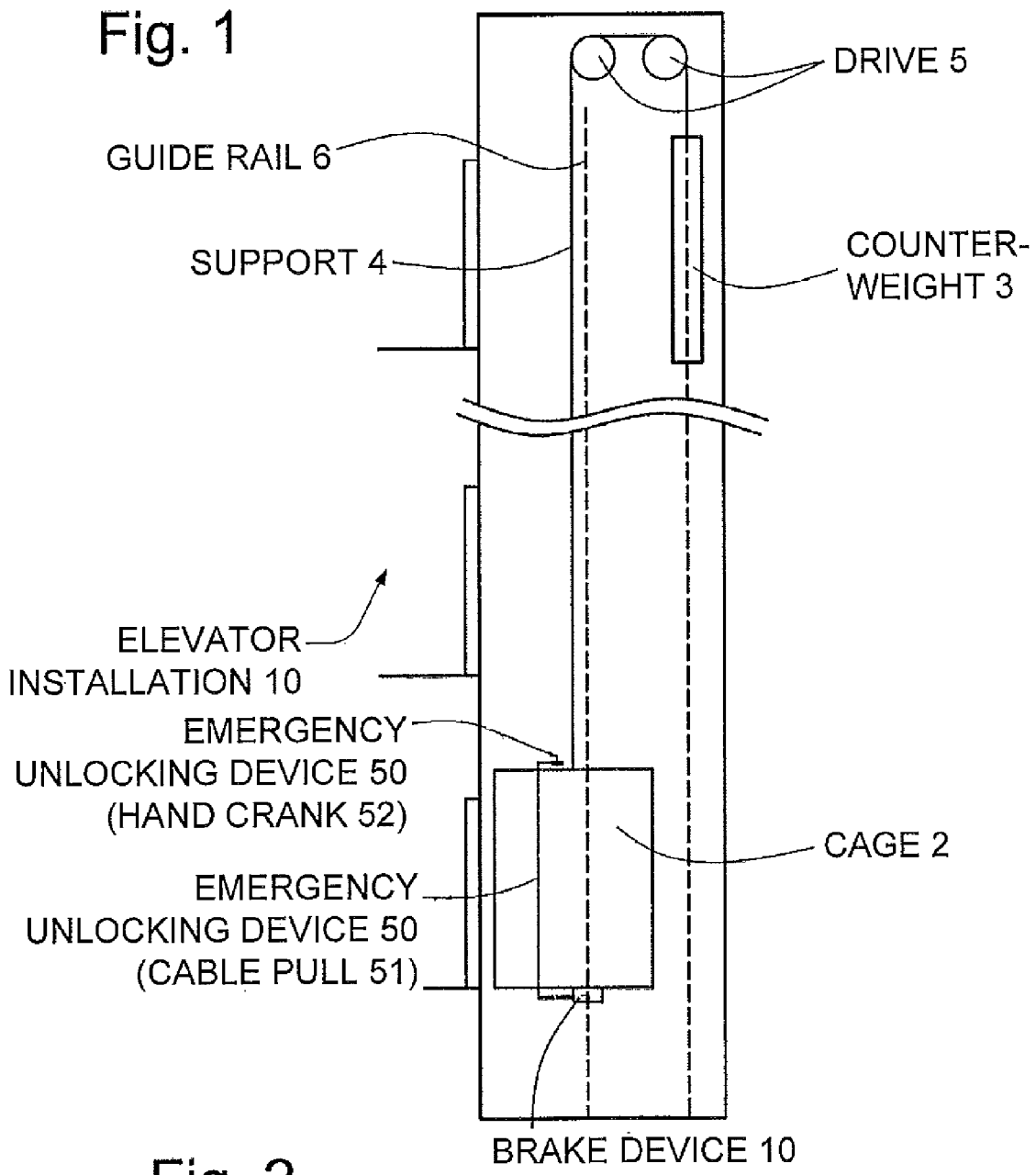
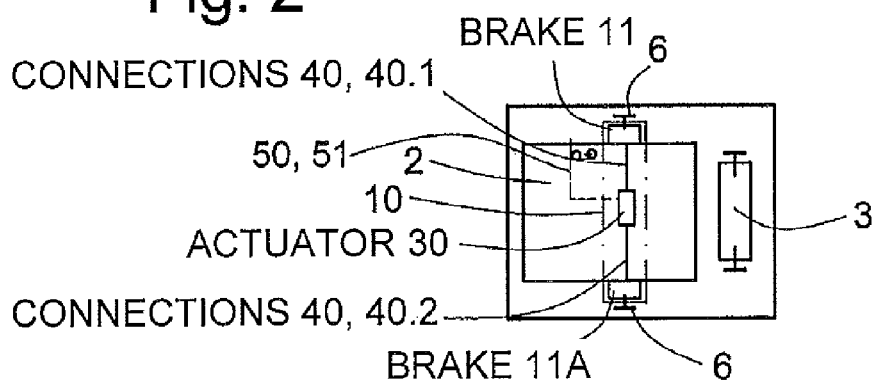

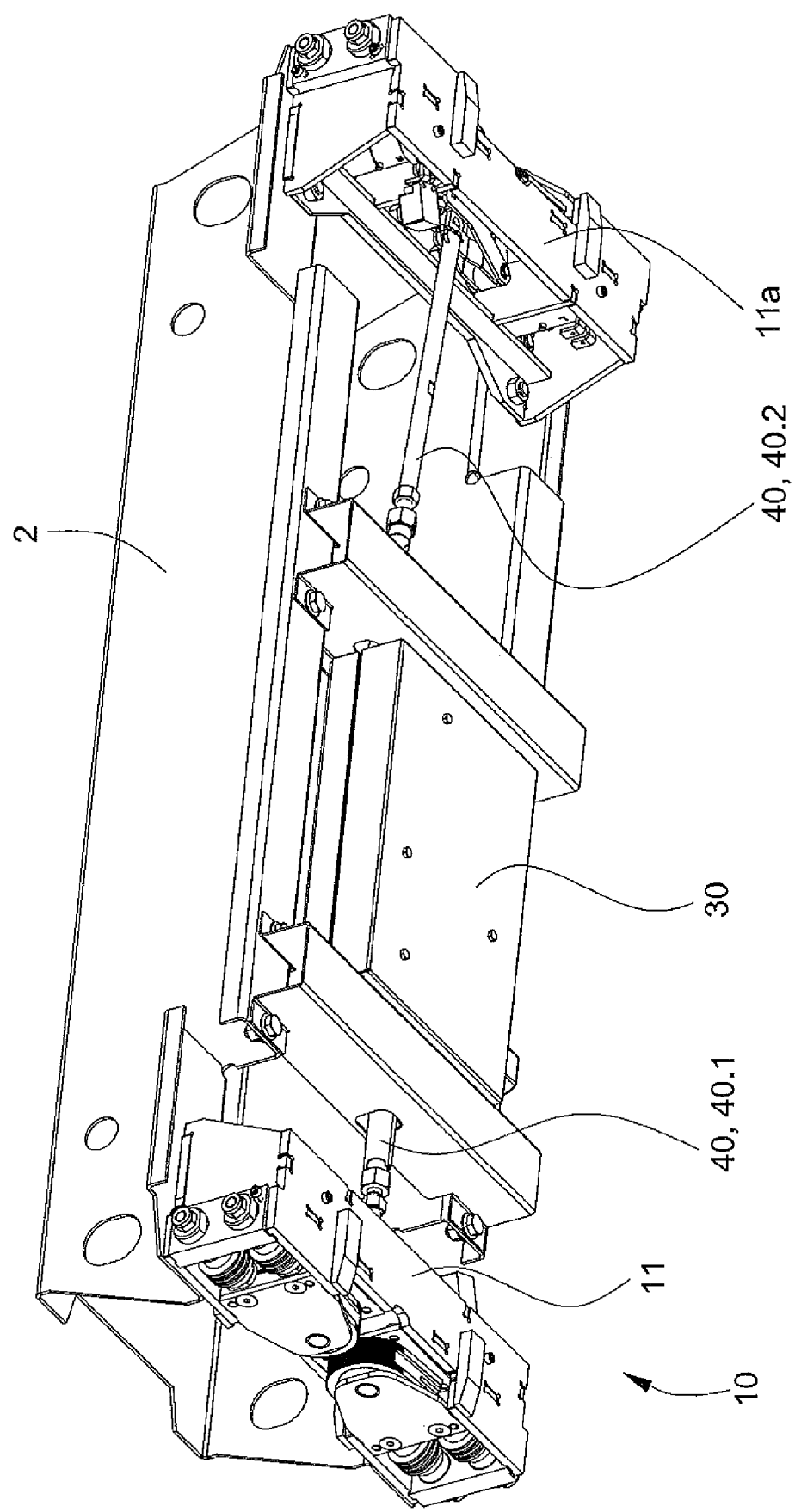

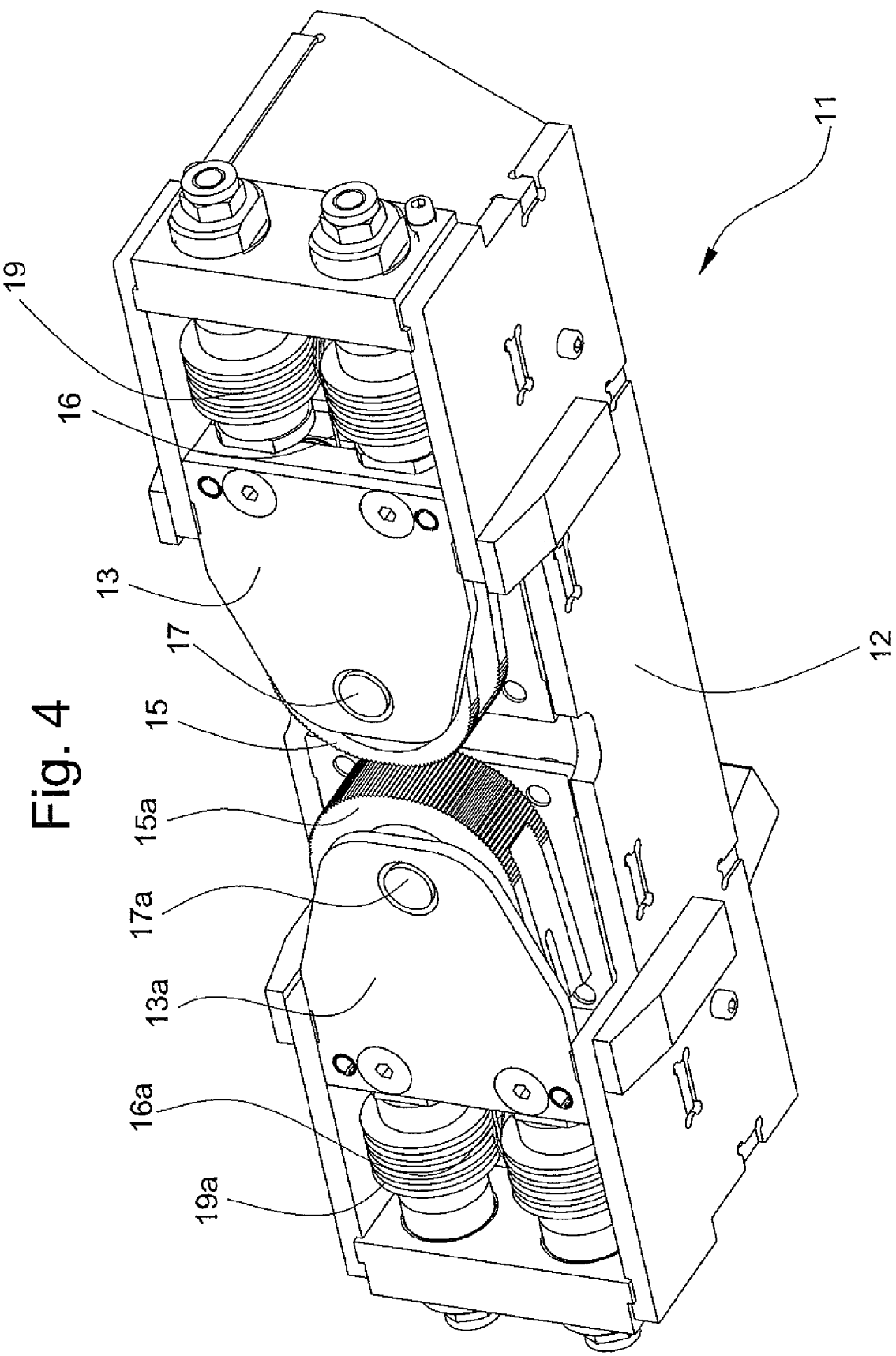

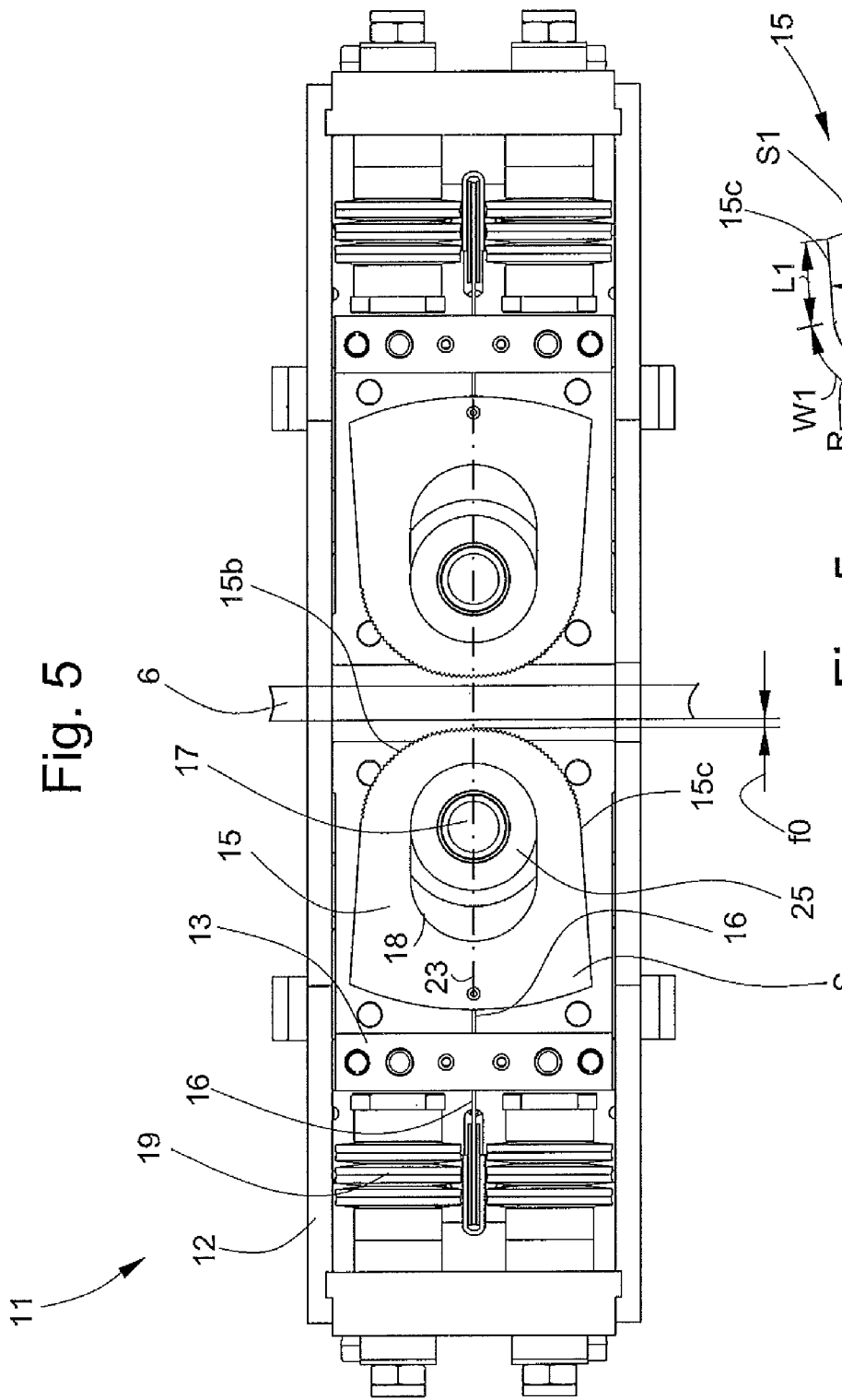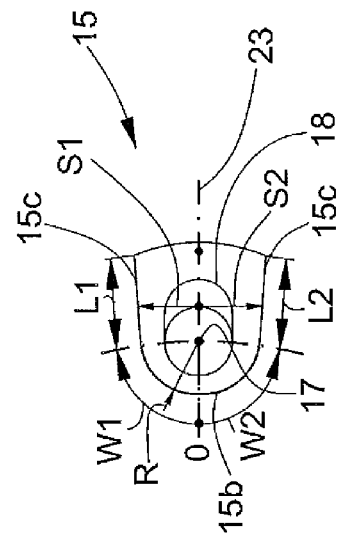

ELEVATOR BRAKING EQUIPMENT

CROSS-REFERENCE TO RELATED APPLICATION

This application claims priority to European Patent Application No. 10156865.7, filed Mar. 18, 2010, which is incorporated herein by reference.

FIELD

The disclosure relates to braking equipment for an elevator cage.

BACKGROUND

The elevator installation is installed in a building. It consists substantially of a cage, which is connected by way of a support with a counterweight or with a second cage. The cage is moved along substantially vertical guide rails by a drive, which selectably acts on the support or directly on the cage or the counterweight. The elevator installation is used for transporting persons and goods within the building between individual or several floors. The elevator installation includes devices in order to safeguard the elevator cage in the case of failure of the drive or the support and also to provide protection against unintended drifting in the case of a stop at a floor. For this purpose use is usually made of brake devices which when required can brake the elevator cage on the guide rails.

A brake device of that kind is known from EP 1733992. This brake device can be actuated electromagnetically, wherein after actuation has taken place and with the elevator cage moving a trigger arm with grooves entrains a rotary shoe with brake plates and these brake plates brake the cage. In this connection, the trigger arm is reset again to a reset position by the rotary shoe. It can be disadvantageous that the trigger arm when the elevator cage is stationary, for example at a stop at a floor, can indeed be actuated, but resetting can be carried out only after rotation of the rotary shoe.

EP 2154096 discloses a further brake device of that kind. This brake device can also be actuated electromagnetically, wherein when required a brake housing with brake shoe is pressed against a rail. A subsequent movement of the brake device rotates the brake shoe into its working setting. In order that sufficient braking force can be achieved, the brake shoe is of appropriately large construction, which results in a substantial installation height of this brake device.

SUMMARY

Some embodiments of the disclosed technologies comprise a brake device with brake and an actuator, which device is suitable for attachment to an elevator cage and can produce braking of the elevator cage. In this connection, the brake device can be actuated even when the elevator cage is stationary so as to prevent any drifting of the cage and it shall be able to be reset again in simple manner.

In this connection, according to some embodiments a brake is described which is provided for attachment to an elevator cage. The elevator cage is guided along guide rails and the brake is suitable for braking the elevator cage at the guide rails or preventing drifting or slipping in a case of a stop at a floor. For this purpose, when required a brake shoe is pressed against the guide rail, whereby a corresponding braking force can be generated. The brake includes a brake housing, a brake shoe support, the brake shoe and advantageously a retraction device. The brake housing includes fastening points in order to fasten the brake to the elevator cage and it includes the constructional fastening and assembly points for the mounting of components of the brake. The brake housing is designed for transmitting required forces. The brake shoe support includes the brake shoe. In a first embodiment the brake shoe support is a brake shoe carriage, which is arranged in the brake housing to be linearly displaceable. The brake shoe support, respectively in this first embodiment the brake shoe carriage can thus be adjusted substantially perpendicularly towards and away from the guide rail surface. Alternatively or in a second embodiment the brake shoe support is a brake shoe lever, which is arranged in the brake housing to be swingable around a substantially horizontal axle. The brake shoe support, respectively in this second embodiment the brake shoe lever can thus also be adjusted substantially perpendicularly towards and away from the guide rail surface by turning it around the horizontal axle.

The brake shoe can have a curved shape, i.e. it includes curved and, if needed, straight brake surfaces which can stand in braking action with the guide rail depending on an instantaneous movement state. It is arranged in the brake shoe support to be rotatable and can also be longitudinally displaceable. A bearing axle, which mounts the brake shoe, can be arranged for that purpose in the brake shoe support. The bearing axle can be provided with a slide coating or with a roller bearing, for example a needle bearing, and the brake shoe has a matching bearing bore.

The brake shoe support can be arranged in the brake housing in such a manner that it can be displaced linearly or rotatable between a readiness setting and an engaged setting. In the readiness setting—the readiness setting also corresponds with the unactuated state of the brake or the unactuated brake—an air gap is present between guide rail and brake shoe. This air gap is usually approximately 1 millimeters to at most approximately 6 millimeters. The air gap makes it possible for the brake not to contact the rail during normal operation, whereby wear and possible grazing are prevented. In normal operation the retraction device holds the brake shoe and/or the brake shoe support in this readiness setting.

The retraction device for that purpose draws the brake shoe support together with the brake shoe away from the guide rail. For actuation, the brake shoe support with the brake shoe is pressed substantially perpendicularly against the guide rail counter to the action of the retraction device. The brake can thus be displaced in simple manner into an engagement setting and also pushed back again to the readiness setting. By virtue of the substantially perpendicular, linear adjustment the brake requires little space in terms of height and can be designed to be able to brake independently of the direction of travel.

Instead of the retraction device use can also be made of merely a detent position, for example a ball catch, which holds the brake shoe support and/or the brake shoe in the readiness setting. Pushing back from this engagement setting to the readiness setting would in this connection be carried out by a further control element.

The brake shoe can obviously also be constructed with, instead of the bearing bore, bearing pins which co-operate with correspondingly formed bearing seats in the brake shoe support.

In some cases, the brake includes an adjusting device which can linearly displace the brake shoe support from the readiness setting to the engaged setting.

In some embodiments, the brake shoe, rotatably arranged in the brake shoe support, is constructed in such a manner that it is rotatable in a first sub-region about the bearing axle and in a second sub-region, which is connected with the first, is arranged to be longitudinally displaceable at right angles or transversely to the bearing axle. The brake shoe can thus, after rotation over the first sub-region has taken place, be longitudinally displaced over the second sub-region in the brake shoe support. For this purpose, the brake shoe is constructed substantially circularly or spirally in the first sub-region and has a substantially rectilinear shape in the second sub-region. The brake shoe has, in some cases, a slot-like inner profile, i.e. the bearing bore is a slot, which enables rotation and subsequent longitudinal displacement. The retraction device engages the brake shoe, whereby the brake shoe is retracted into the readiness setting by the retraction device and the entire brake shoe support is also retracted by the action of the force on the bearing axle. Moreover, sometimes the arcuate shape of the first sub-region is formed in such a manner that a spacing of the curve from the bearing axle increases in dependence on a rotational angle, such as in the case of a spiral section proportionally to the rotational angle, and the rectilinear shape of the second sub-region is formed in such a manner that a spacing of the rectilinear shape from the longitudinal axis further increases in dependence on a longitudinal displacement, such as in the case of a wedge.

A possible effect is that the brake shoe on reaching the engagement setting is rotated in correspondence with the travel direction of the elevator cage and in correspondence with the spirally curved shape of the first sub-region, whereby the spacing of the curve from the bearing axle increases and the brake shoe support is correspondingly pushed back. Consequently in this first operating phase compensation is substantially provided again for the adjustment play which is lost during adjustment from the readiness setting to the engaged setting. During this movement accordingly merely a small actuating force required for adjustment of the brake shoe support is present. In the absence of this actuating force, thus in the case of a possible resetting of the brake, the retraction device can guide the brake shoe support directly back to the readiness setting.

If the elevator cage or the brake shoe moves further or if it is disposed in travel, the brake shoe is, however, automatically moved again. It now transfers from the rotational movement, with reaching of the second sub-region, into a rectilinear adjusting movement. The brake shoe is longitudinally displaced at right angles to the bearing axle, whereby the spacing of the curve from the bearing axle further increases. This increase in spacing, or the second operating phase, produces a further pushing back of the brake shoe support. This is used in order to build up a pressing force, which can allow secure braking of the cage.

A brake designed in that manner can be used primarily in order to, for example, secure an elevator cage against drifting when it is stopped at a floor and in order to be able to nevertheless reset the brake again in simple manner in the case of only slight drifting movements, which derive from, for example, cable stretching. The braking action is in addition present in both travel directions and overall only a small constructional height is needed. Moreover, through the definition of the shape of the first and second sub-regions, the resulting pressing and thus braking force in the two directions of travel can be differently defined. In order to secure the cage against failing, larger braking forces are usually required than in the case of braking the cage during upward travel.

In further embodiments, the brake further includes a compression spring group with compression springs. These compression springs are biased in the compression spring group to a presettable biasing force. The brake shoe support is in the readiness setting positioned by the retraction device to bear against the compression spring group or is drawn by the retraction device against an abutment determined by the compression spring group. The braking force can thus be selectively set, since the travel geometries and thus the resulting spring travels are determined by the shape of the brake shoe. A required bias can thus be defined on the basis of spring characteristics and with consideration of anticipated coefficients of friction between brake shoe and guide rail.

In some cases, the retraction device includes a spring device engaging the brake shoe, for example a spiral spring, which can engage the brake shoe by way of a cable pull and thus draw the brake shoe support into the readiness setting. The brake shoe can thus be brought back on each occasion to its centre position and the brake shoe support retracted to the compression spring group at the same time.

In further cases, the brake shoe is of asymmetrical construction, so that a respective second rectilinear sub-region is connected on either side with the arcuate shape of the first sub-region in such a manner that a spacing between the curve and the connecting rectilinear shape and the bearing axle increases in dependence on the rotational angle and the longitudinal displacement. The increase in the spacing is different depending on the rotational direction and displacement direction of the brake shoe. Braking forces dependent on travel direction can thereby be produced, since the different increases in the spacing produce different pressing forces. This can be helpful, since in an elevator installation, as already described in the foregoing, greater forces are usually required in downward direction in order to be able to catch a possibly dropping elevator car or cage. The brake shoe itself is made of a material which is suitable as braking material. In the simplest case this can be hardened steel surfaces or also be high-quality, for example ceramic, braking surfaces which are then advantageously coated on a base body or fastened thereto. In addition, use of brake surfaces with hard-metal inserts can also be possible. An angle of rise, which describes the change in spacing of the curve from the fulcrum or from the longitudinal axis in dependence on the rotational angle and the longitudinal displacement, is determined on the basis of matching to the braking material employed, so that a self-actuating or automatic engagement of the brake can, in some cases, be guaranteed as soon as the brake shoe support has reached its engagement setting and a travel movement of the elevator cage takes place.

Since the braking forces required in downward direction are usually significantly greater than the braking forces required in upward direction, the pressing forces are, as already explained, appropriately controlled by the shaping of the brake shoe. In order to achieve good braking, however, also minimum area pressures between brake shoe and guide rail can be required, which ensure build-up of a sufficient coefficient of friction. In order to achieve comparable area pressures in downward and upward direction, it can be of advantage if the relevant second sub-region of the brake shoe is formed with a smaller brake area, for example by formation of longitudinal grooves or longitudinal skids.

In some cases, a brake of that kind has in each instance two brake shoe supports with brake linings and a retraction device and if these parts are installed substantially in symmetrical arrangement in the brake housing to be opposite one another, so that, on co-operation with the guide rail, the guide rail runs between the two brake shoe supports with associated brake linings. The adjusting device is in that case constructed so that in the case of adjustment the two brake shoe supports are displaced towards one another, whereby the associated brake linings clamp the guide rail.

Alternatively, the brake includes additionally to the brake shoe support with brake shoe and retraction device a brake plate which is fixed opposite to this brake shoe support, so that, on co-operation with the guide rail, the guide rail runs between the brake shoe support with associated brake shoe and the fixed brake plate.

Two mutually opposite brake shoe supports are advantageous if a larger air gap is to be achieved on both sides of the guide rail. However, this construction requires a corresponding amount of constructional space on either side of the rail. A brake plate fixed at one side is consequently advantageous if small air gaps suffice. Constructional space can thus be saved, since only a small amount of space is required on one side of the rail. This construction can at the same time also be more advantageous to produce.

In a brake of that kind braking can be achieved in overall simple manner if the brake shoe support is adjusted by means of the adjusting device from its readiness setting into the engagement setting, wherein the brake shoe arranged in the brake shoe support is pressed by means of the adjusting device against the guide rail.

Insofar as the cage is at standstill, for example at a floor, the brake remains in this engaged setting. If the cage, under correct control, wants to move away from standstill, the brake is reset by a control in that the adjusting device in co-operation with the retraction device brings the brake shoe support back again to the readiness setting. This can be possible by a small force, since a significant pressing force is still not present.

If, however, the cage unintentionally moves away from standstill or is disposed in travel, the brake shoe is automatically rotated along the first sub-region of the brake shoe. In that case, the brake shoe support is pressed back in correspondence with the shape of the brake shoe, particularly by the first increase in spacing determined by the first sub-region. In this movement phase an adjusting play which has arisen by the adjustment of the brake shoe is equalized again. Up to this point in time the adjusting device or the retraction device can retract the brake shoe support at any time back into the readiness position. Thus, acceptance of or compensation for small fluctuations, such as can take place during loading of the cage, can be provided.

If, however, the cage moves again, an automatic longitudinal displacement of the brake shoe along the second sub-region of the brake shoe now takes place. The brake shoe support is thus pressed back in correspondence with the second increase in spacing determined by the second sub-region of the brake shoe. A required pressing force, which produces braking of the cage, is now built up by way of the pressure body.

In further embodiments, an actuator is described such as can be used for adjustment of the previously described brake.

The actuator can be designed in order to hold a brake or preferably two brakes of an elevator cage in a readiness setting and when required to bring it or them into an engagement setting. In this connection the actuator includes a force store, a holding device, a resetting device and one or preferably two connecting points connecting the actuator to the brake or to the adjustment device of the brake.

In some cases, the force store is a spring store which is suitable for acting on the connecting point when required and bringing the brake from its readiness setting into the engagement setting. In this regard the holding device holds the force store and thus the connecting point, advantageously by means of an electromagnet, in a first operating position corresponding with the readiness setting of the brake and the resetting device can bring the force store, the holding device and the connecting point after actuation thereof back again into the operating position. The force store can obviously also be a pneumatic or hydraulically biased store which can deliver its energy when required.

In further cases, the force store, the holding device and the connecting point co-operate by way of an actuating lever. This actuating lever can include a first connecting point for connection with the first brake and a second connecting point for connection of the actuator with a second brake. The first and if need be second connecting point can be so arranged at the actuating lever that they are substantially drawn together under the action of the force store. Essentially this means that the two connecting points do not necessarily have to be directly drawn linearly towards one another, but that, for example, in the case of use of the actuating lever the two connecting points can be displaced in such a manner that an attraction effect results, which produces the adjustment of the brakes. This attraction of the two connecting points is, in particular, to be understood in the sense that connections which connect the actuator with the brakes are drawn towards one another or pushed towards one another under the action of the force store, whereby they produce a tension force on the two brakes or on adjusting devices of the brakes.

In another embodiment the actuator further comprises a damping device which damps the course of movement during actuation of the actuator. An end collision of the actuator and the impact noises, which arise from this end collision, and material loads can thus be reduced.

In some cases, the resetting device includes a spindle motor. The spindle motor can be a geared motor. A hydraulic or pneumatic resetting device can also be used instead of this spindle drive.

The actuator can include a manually actuated emergency unlocking means. This manually actuated emergency unlocking means is preferably provided in addition to the resetting device. In the case of a defect of the resetting device or in the case of a power failure of longer duration it can be used in order to reset the actuator by hand to such an extent that load relief of the cage is possible. By load relief there is to be understood in this connection a recall of the elevator cage from a blocked setting, such as takes place in the case of emergency braking. This emergency unlocking can be realized in such a manner that, for example, there is action by means of cable pull on the connections which connect the actuator with the brake.

An elevator installation equipped in accordance with the disclosed technologies can comprise at least one elevator cage, which is arranged to be movable along at least two guide rails, and a brake device attached to the elevator cage. The brake device can include at least two brakes as described in the foregoing and the brakes each co-operate when needed with a respective guide rail. In addition, the elevator cage can include an actuator, such as is explained by way of example in the foregoing description, and which actuates the brakes when required.

BRIEF DESCRIPTION OF THE DRAWINGS

The disclosed technologies are explained by way of example in the following in conjunction with the figures, in which:

FIG. 1 shows a schematic view of an elevator installation in side view,

FIG. 2 shows a schematic view of the elevator installation in cross-section,

FIG. 3 shows a perspective a view of a brake with actuator at an elevator cage,

FIG. 4 shows a perspective individual view of a brake,

FIG. 5 shows a front view of the brake of FIG. 4 in the readiness setting,

FIG. 5a shows a view of a brake shoe,

In the figures the same reference numerals are used for all equivalent parts over all figures.

DETAILED DESCRIPTION

Figure 5B:
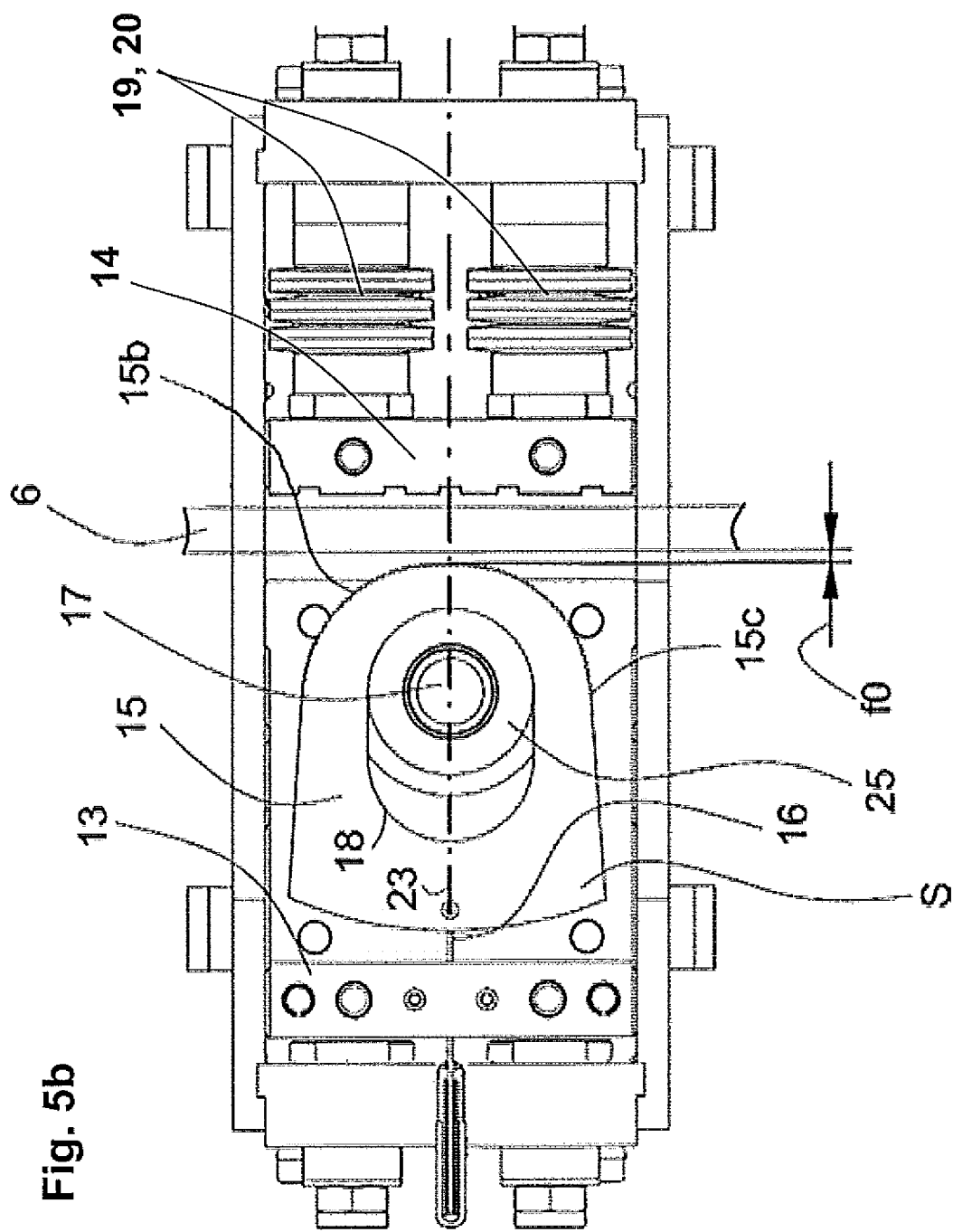
FIG. 5b an embodiment of the brake of FIG. 4.

FIG. 1 shows an exemplary elevator installation 1 in an overall view. The elevator installation 1 is installed in a building and serves for the transport of persons or goods within the building. The elevator installation includes an elevator cage 2, which can move upwardly and downwardly along guide rails 6. The elevator cage 2 is accessible from the building by way of doors. A drive 5 serves for driving and holding the elevator cage 2. The drive 5 is arranged in the upper region of the building and the cage 2 hangs by support means 4, for example support cables or support belts, at the drive 5. The support means 4 are in addition led by way of the drive 5 to a counterweight 3. The counterweight balances a mass component of the elevator cage 2 so that the drive 5 primarily merely has to provide compensation for an imbalance between cage 2 and counterweight 3. The drive 5 is, in the example, arranged in the upper region of the building. It can obviously also be arranged at another location in the building or in the region of the cage 2 or the counterweight 3.

The elevator cage 2 is equipped with a brake device 10 suitable for braking the elevator cage 2 in the case of unexpected movement, in the case of excess speed or in the case of securing at a stop and/or decelerating. The brake device 10 is, in the example, arranged below the elevator cage 2. The brake device can be electrically activated (not illustrated). A mechanical speed limiter, such as is usually used, can accordingly be eliminated.

FIG. 2 shows the elevator installation of FIG. 1 in a schematic plan view. The brake device 10 includes two brakes 11, 11a, an actuator 30 and associated connections 40, 40.1, 40.2. The two brakes 11, 11a can be of identical construction and act as required on the guide rails 6 which are arranged at both sides of the cage 2. This means that they are in a position of braking and fixing the cage 2 at the rail 6. The connections can in principle be constructed as pull or push connections. As a rule, however, connections in the form of pull connections have proved better, as the risk of kinking of connections is thereby eliminated. Thus, connections 40 in the form of pull rods, pull cables, Bowden cables or similar pull means have proved themselves. Use is made in the example of an actuator 30 which when actuated draws the associated connections 40, 40.1, 40.2 substantially towards one another.

An optional emergency unlocking means 50 is in addition provided in FIGS. 1 and 2. The emergency unlocking means includes a cable pull 51, which is connected with the actuator 30 below the elevator cage 2 and there enables unlocking of the actuator 30 as explained later. A hand crank 52 can be mounted above the cage 2 at an easily accessible location. A traction force can be transmitted in the case of need by way of the cable pull 51 to the actuator 30 by means of this hand crank 52. In the normal case the hand crank 52 is stored away from the emergency unlocking means so that only trained persons can actuate the emergency unlocking means. The cable pull 51 is led to the actuator 30 via required deflections (not illustrated). A Bowden pull or a traction linkage or, for example, also a manual, hydraulic connection can obviously also be used instead of the cable pull.

The illustrated arrangements can be adapted by the expert to the elevator installation. The brakes can be attached above or below the cage 2. In addition, several brake pairs can also be used at a cage 2. The brake device can obviously also be used in an elevator installation with several cages, wherein then each of the cages has at least one brake device of that kind. The brake device can if required also be attached to the counterweight 3 or it can be attached to a self-propelled cage.

FIG. 3 shows a support structure of an elevator cage 2 in a perspective view from below. A first brake 11 is attached to the left side of the support structure of the cage 2 and a second brake 11a is disposed at the opposite side, on the right in the figure. The two brakes are of identical construction. The actuator 30 is similarly attached to the cage 2 between the two brakes 11, 11a. The actuator 30 is connected with the brakes 11, 11a by way of connections 40 at both sides, these being connecting rods in the example. The connections 40 can be constructed to be adjustable. The brake device can thereby be adjusted precisely to a width of the cage 2.

In the case of need the actuator 30 draws the connections 40 towards one another and thereby actuates the two brakes 11, 11a simultaneously. The actuator 30 is arranged at the cage to be horizontally movable, so that it is substantially centered with force equilibrium between the two brakes 11, 11a. This arrangement is also termed floating mounting. The actuator 30 is for that purpose arranged, by way of example, on horizontal slide members or slide rods. A positioning device 44 (see FIGS. 10 and 11) in that case keeps the actuator 30 in a defined position with a small force. In the example according to FIG. 3 the actuator 30 is arranged eccentrically. As a result, one side of the connections 40, for example a first connection 40.1, can be prefabricated in standard manner and merely the opposite, second connection 40.2 has to be adapted to a dimension of the cage 2. Since the function of the two brakes 11, 11a is identical, this is explained in the following only by way of the brake 11.

FIGS. 4 and 5 show an example of a brake 11 in the so-termed readiness setting or also in the unactuated setting thereof. The brake 11 is in itself again of substantially symmetrical construction. Thus, disposed in a brake housing 12 are left and right brake shoe supports 13, 13a, left and right brake shoes 15, 15a, etc. The construction and the function are explained in the following merely by reference to one side. Also in this embodiment the brake shoe support is designed as a linear displaceable brake shoe carriage 13.

The brake 11 thus includes the brake housing 12, the brake shoe carriage 13 with brake shoe 15, a retraction device 16 and a compression spring group 19. The brake shoe carriage 13 includes the brake shoe 15.

A brake shoe 15 is illustrated in detail in FIG. 5a. The brake shoe 15 has a first sub-region 15b. In this first sub-region 15b the brake shoe 15 is of substantially circular or spiral construction. The first sub-region 15b is provided with a knurling so as to achieve good capability of gripping. The arcuate shape of the first sub-region 15b is in that case formed in such a manner that a spacing R of the curve from a bearing axle 17 continuously increases in dependence on a rotational angle W1, W2, such as in the case of a spiral. Starting from the bearing axle 17 the brake shoe 15 has a slot 18 extending along a longitudinal axis 23. Subsequently, connected with the first sub-region 15b of the brake shoe 15 a second sub-region 15c with a rectilinear shape. The rectilinear shape of the second sub-region 15c is formed in such a manner that a spacing S1, 82 of the rectilinear shape from the longitudinal axis 23 further increases in dependence on a longitudinal displacement L1, L2. The second sub-region 15c is formed as a sliding/braking region. This can be a ceramic friction lining which is coated on the brake shoe body. In the mentioned example the second sub-region 15c is integrally integrated in the brake shoe 15 and consists of hardened steel. The brake shoe has a thickness s of approximately 15 to 30 millimeters so that in the case of engagement with the brake shoe 6 an ideal brake couple can form.

The brake shoe 15 formed in that manner is installed in the brake shoe carriage 13 by way of the bearing axle 17. The brake shoe carriage 13 has side plates 24 which support the bearing axle 17. The brake shoe 15 is arranged on the bearing axle 17 by way of a rotary slide bearing 25. The brake shoe 15 can thereby be rotated on the bearing axle 17 and can also be longitudinally displaced in the regions of the slot 18.

A retraction device 16 (see FIGS. 4 and 5) engages the brake shoe 15 and draws the brake shoe 15 in a horizontal position and simultaneously the entire brake shoe carriage 13 against an abutment. This abutment is formed by the compression spring group 19. The compression spring group 19 includes a plurality of compression springs 20 which are biased in the compression spring group 19 to a predefined biasing force. In this state of readiness an air gap f0 of approximately 3 millimeters thus results. This air gap is a free spacing between the brake shoe 15 and the guide rail 6. It is selected by the expert with consideration of guidance inaccuracies.

Figure 6:
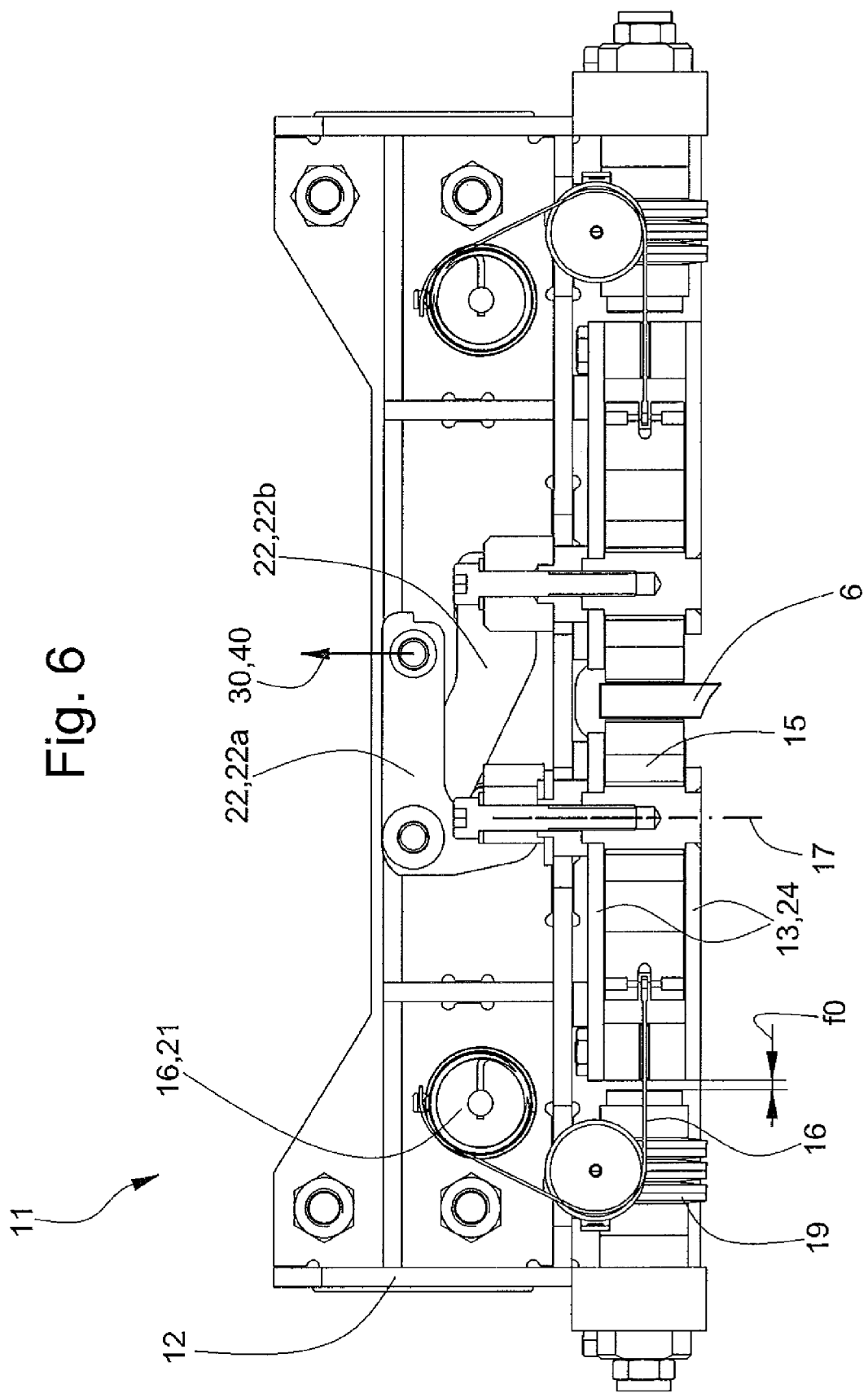
FIG. 6 shows a plan view of the brake of FIG. 4.

The retraction device 16 is, as apparent particularly in FIG. 6, a spring device 21, in particular a spiral spring, which by way of deflections engages the brake shoe by means of a pull cable and correspondingly retracts this. A retraction force produced by the retraction device is typically approximately 40 Newtons.

In addition, the brake 11 includes an adjusting device 22 which when required can adjust the brake shoe carriage 13 or the two brake shoe carriages 13, 13a, thus eliminate the air gap f0. The adjusting device 22 comprises a lever support 22b, which is fastened substantially rigidly on one of the brake shoe carriages 13a and which has a bearing point for mounting a first lever 22a. The first lever 22a is so designed that it can press by one end on a pressure plate of the other brake shoe carriage 13. The other end of the first lever 22a is connected with the actuator 30 by means of the connection 40. As soon as the actuator draws the first lever 22a, it urges the two brake shoe carriages 13, 13a towards one another and eliminates the air gap f0, whereby the engagement setting is achieved. In FIG. 6 the brake is disposed in this engagement setting. The air gap in the region of the guide rail 6 is removed and the brake shoe carriage 13 is adjusted to such an extent that a gap corresponding with the air gap f0 arises between compression spring group 19 and brake shoe carriage 13.

Figure 7:
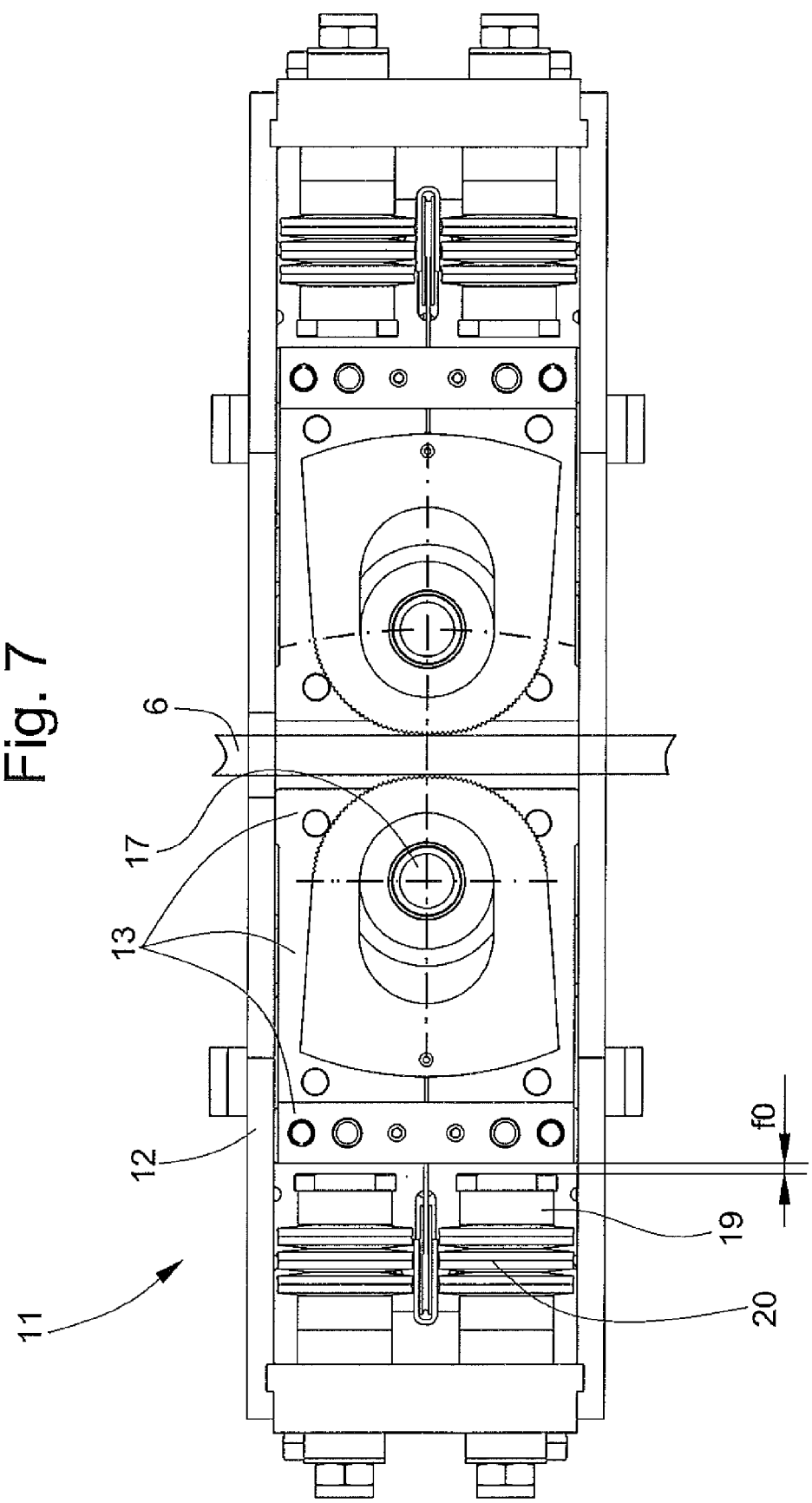
FIG. 7 shows a front view of the brake of FIG. 4 in the engaged setting.

FIG. 7 shows the brake similarly in the engagement setting. The brake shoe carriages 13 are pressed towards one another in such a manner that the brake shoes 15 clamp the guide rail 6. In that case it is evident that the brake shoe carriage 13 now no longer bears against the compression spring group 19, but that a gap, corresponding with the air gap f0, arises between compression spring group 19 and brake shoe carriage 13.

Insofar as the elevator cage 2 is at standstill, the brake 11 remains in this engaged setting. On resetting of the adjusting device 22 the brake shoe carriages 13, 13a can be retracted by the retraction device 16 directly back into the readiness setting thereof and the cage 2 is thus released for travel. To the extent that the cage 2, however, unintentionally moves on, the brake 11 is automatically moved into braking setting.

Figure 8:
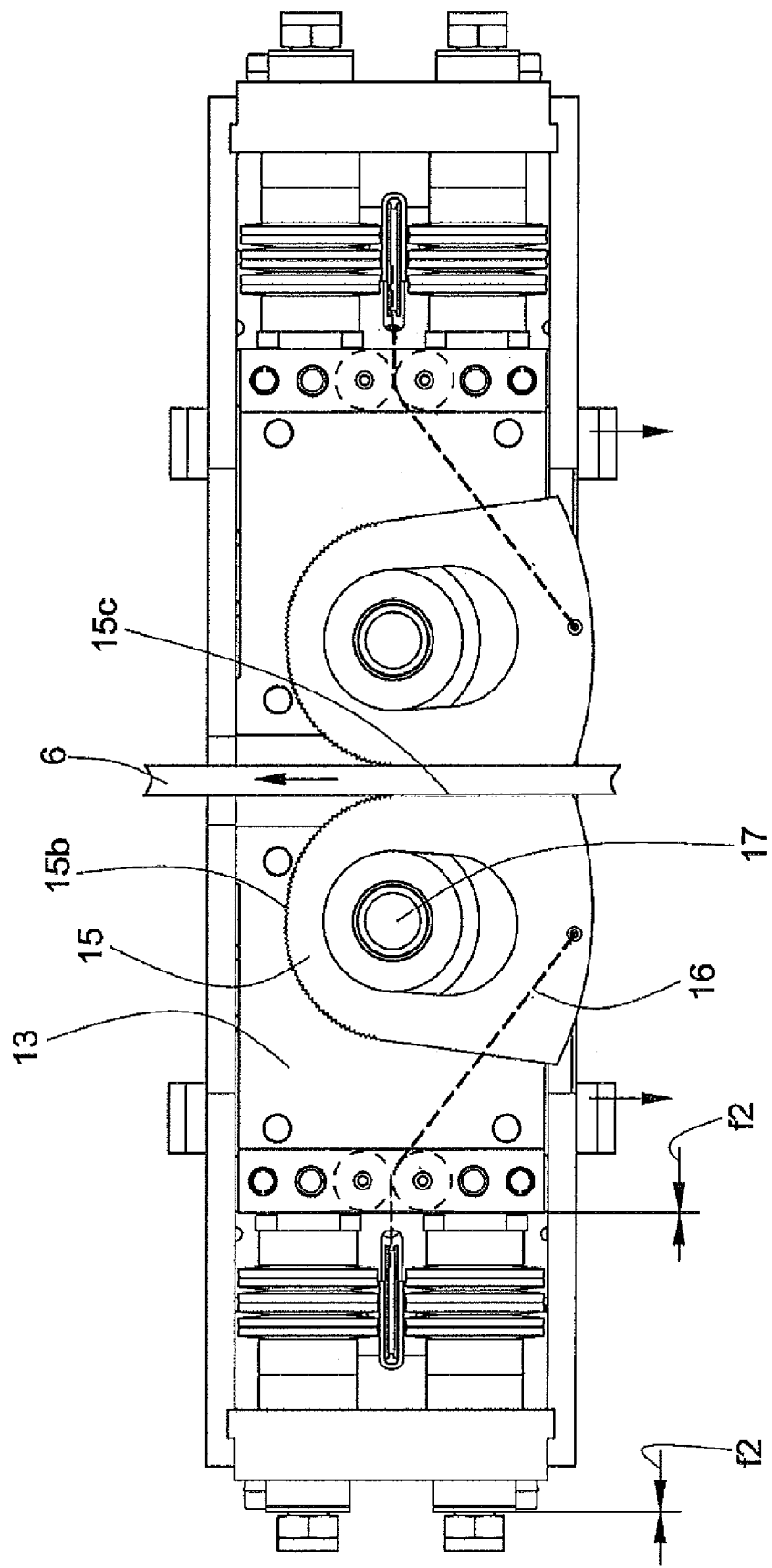
FIG. 8 shows a front view of the brake of FIG. 4 with rotated brake shoe.

In FIG. 8 the cage 2 or the brake 11 has now moved downwardly in relation to the guide rail 6. The brake shoe 15 is turned on the bearing axle 17 along the first sub-region 15 by the guide rail 6 or the guide rail surface thereof and now bears by the second sub-region 15c against the guide rails 6. Due to the increasing radius of the first sub-region 15b the brake shoe carriage 13 is pressed back. The previous air gap f0 between brake shoe carriage 15 and compression spring group 19 is thereby eliminated and, in the example, the compression spring group 19 is already biased by a minimum amount f2. Up to the point of elimination of the air gap f0, a decisive braking force has still not arisen, since re-stressing of the compression spring group 19 has still not taken place. It would thus remain possible during this operating range to retract the brake shoe carriage 13 by the adjusting device 22 and retraction device 16 into the readiness setting and to free the brake 11 again. This can be helpful if slipping of the cage 2 during loading is to be limited by this brake 11. Such slipping can, for example, happen in the case of overloading of the cage 2 or also in the case of a defect of elevator components.

The brake 11 can thus be preventatively brought into the engagement setting at a stopping point and thereby prevent risk-laden slipping. Insofar as in accordance with correct functioning no slipping takes place, the brake 11 can simply be reset again before a departure.

Figure 9:
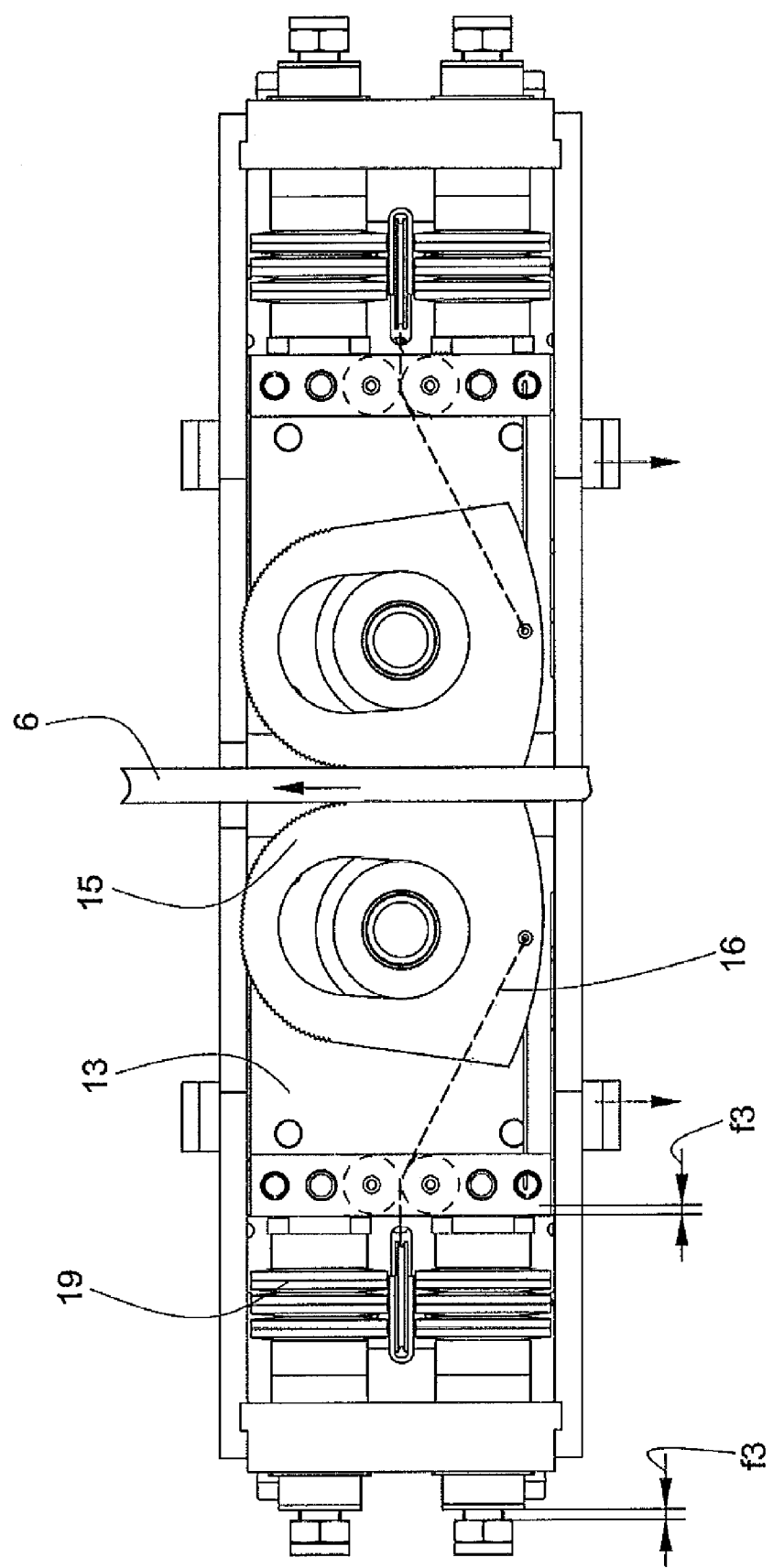
FIG. 9 shows a front view of the brake of FIG. 4 in the braking setting.

If the cage 2 now moves again, the brake shoe 15 remains, as illustrated in FIG. 9, adhering to the rail 6 by the friction effect between the second sub-region 15c and the guide rail 6. The brake 11 rolls, by way of the rotary/slide bearing of the bearing axle 17, along the slot and the brake shoe carriage 13 is further pushed back in correspondence with the increase in the spacing S1 of the second sub-region 15c. The compression spring group 19 is thereby further stressed until it has achieved its final stress in correspondence with a spring compression f3. This spring compression f3 produces an associated pressing force which now causes braking of the elevator cage 2. The lever of the adjusting device 22 or the actuator 30 is constructed in such a manner that it can tolerate this spring compression f3. This can be achieved by free running, play or resilient regions.

In order to be able to reset the brake again after standstill of the elevator cage 2 has taken place, the cage 2 has to be moved back, whereby the engagement process takes place in reverse sequence. In that case, before resetting of the cage 2 the adjusting device 22 is adjusted back. As result, in the case of adjusting back of the elevator cage 2 the brake shoe 15 and the brake shoe carriage 13 are directly held in the readiness setting.

By virtue of the construction of the brake shoe 15 this afore-described adjusting and engaging process takes place in both directions of travel, wherein the spring compressions f1 to f3 arise in correspondence with the shape of the brake shoe 15 or the form of the first and second sub-regions 15b, 15c of the brake shoe 15. In the case of braking in upward direction, obviously smaller braking forces are required. This is taken into consideration in that the spring compression travels in upward direction are selected to be smaller.

Respective brake positions and states of the adjusting device can be detected electrically or by position detectors. These state indications are processed in a control and subsequently used as fault indications or for sequence control of the elevator.

FIGS. 10 to 13 show an example of an actuator 13 such as can be used for actuation of a brake 11 as explained in the foregoing figures.

Figure 11:
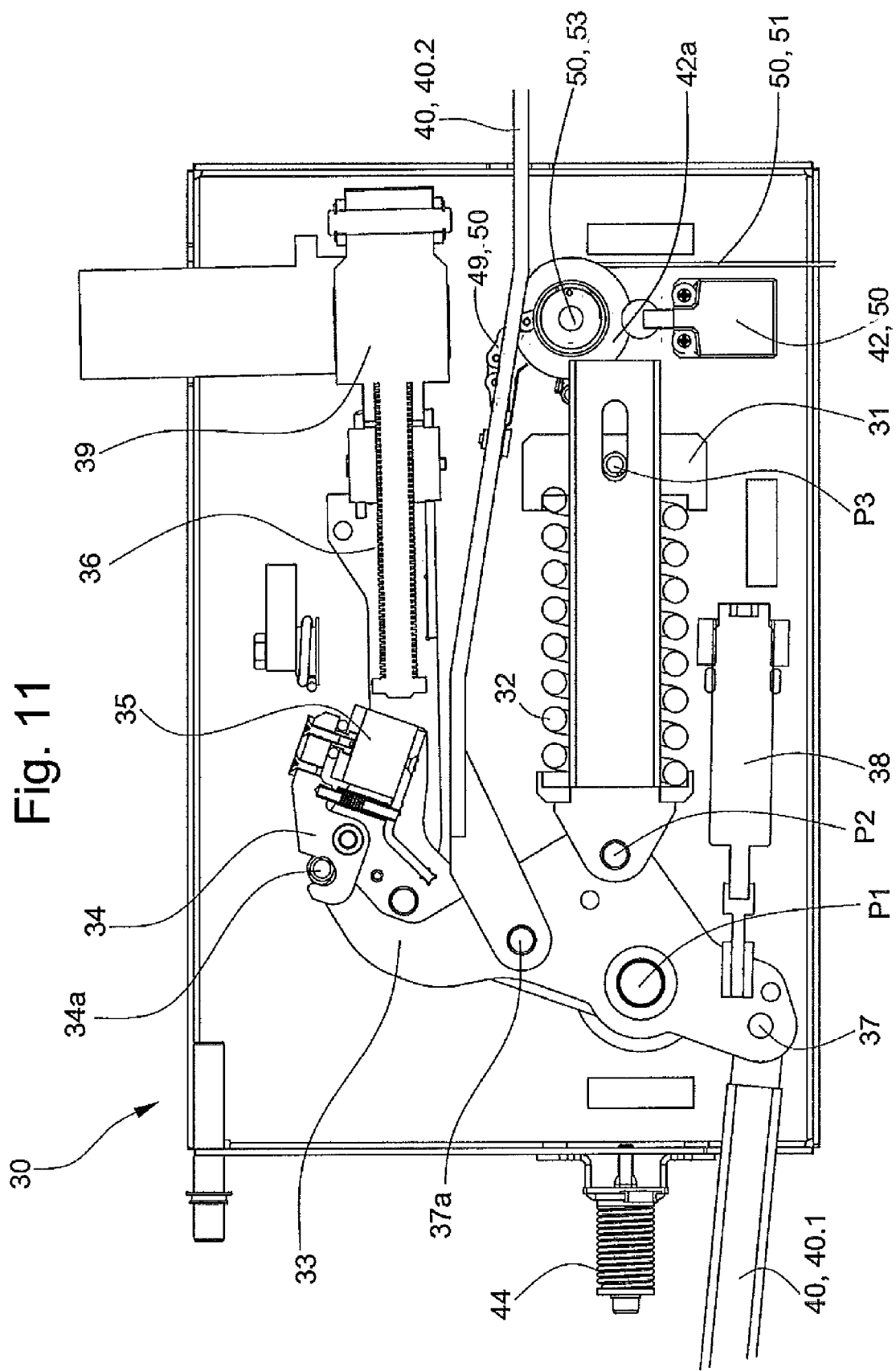
FIG. 11 shows a plan view of the actuator in unactuated setting.

The actuator on the one hand keeps the brake 11 of an elevator cage or the brake device in a readiness setting or in an unactuated setting thereof (see FIG. 11). This state is termed closed setting of the actuator 30. The actuator 30 brings the brake 11 when required from the readiness setting to an engaged setting. The actuator 30 also resets the brake 11 or a corresponding adjusting device 22 back into a setting which enables return of the brake 11 to the readiness setting. For this purpose the actuator 30 has electrical interfaces with respect to a control, which, for example, communicates the corresponding control commands or receives any status reports of the actuator 30 and/or the brake 11. In addition, power storage means which might be required are present in order to safeguard functioning in the case of power failure.

The actuator 30 includes a force store 31, a holding device 34, a resetting device 36 and one or two connecting points 37, 37a, which connect the actuator 30 with the brake or at least two brakes 11 or the adjusting devices 22 thereof. The force store 31 can be a spring store 32, which is supported at one end by means of a support point P3 in a housing of the actuator 30, and the other end of which presses by way of an engagement point P2 against an actuating lever 33. The actuating lever 33 is rotatably mounted in the housing by means of a fulcrum P1 and the holding device 34 holds, by means of a pawl which engages a catch 34a, the actuating lever 33 in the closed setting, which corresponds with the readiness setting of the brake 11, against the spring force of the force store 31. The catch 34a in this regard can be a rotatable pin or bush which is suspended in the hook-shaped pawl of the holding device 34. This construction gives constant friction conditions and thus a reproducible, constant trigger behavior.

The actuating lever 33 is connected by a first connecting point 37 with a first connection 40, 40.1 and by a second connecting point 37a with a second connection 40, 40.2. The connections 40, as described in connection with FIG. 3, lead to the brakes 11, 11a at both sides.

Figure 12:
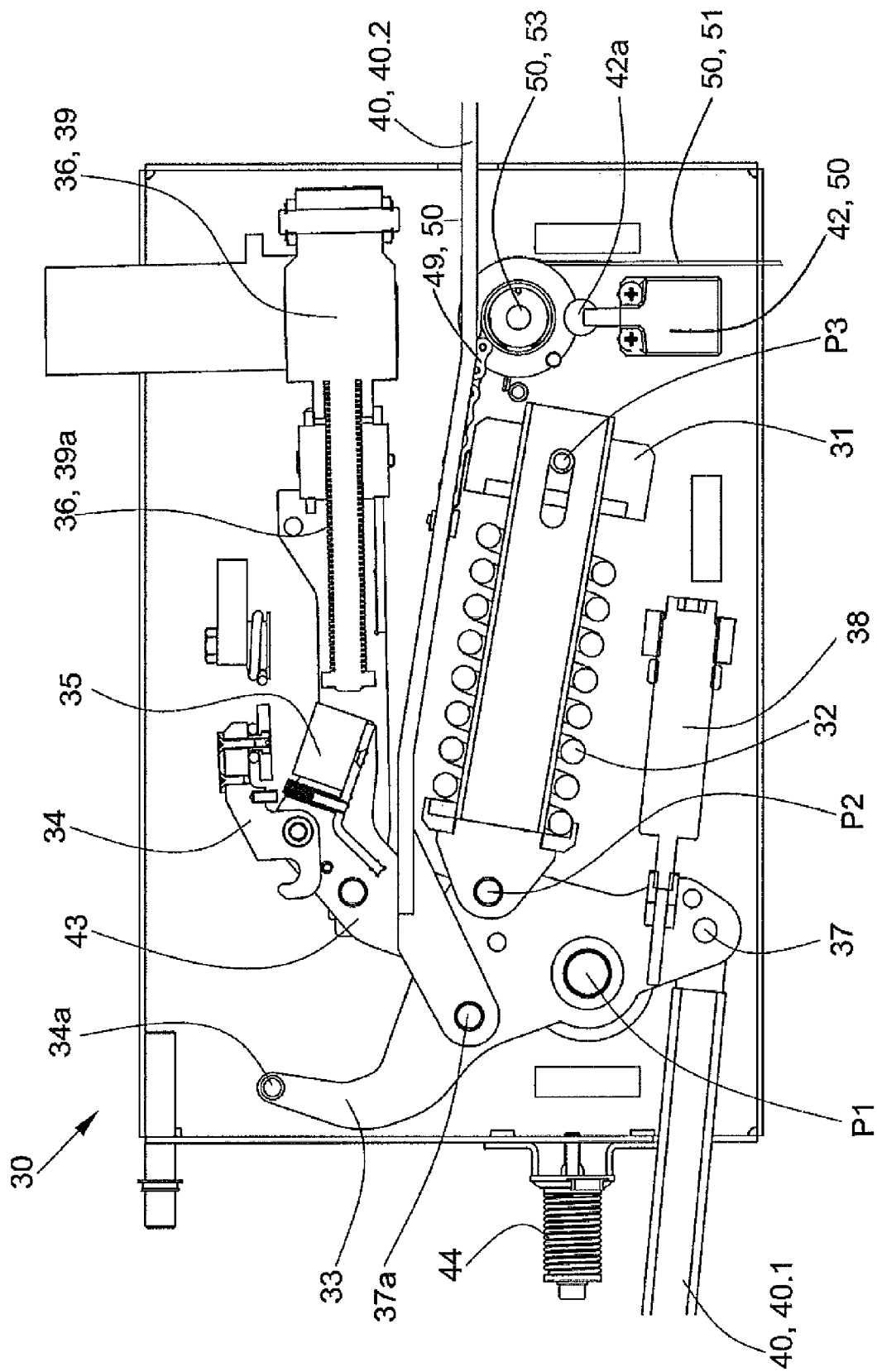
FIG. 12 shows a plan view of the actuator in actuated setting.

The holding device 34 includes an electromagnet 35 which holds the holding device 34 in the closed setting. If the electromagnet 35 is switched to be free of current, the force store 31 presses the pawl of the holding device 34 back, whereby the catch 34a of the actuating lever 33 is freed (see FIG. 12). The force store 31 presses the actuating lever 33 into the engaged setting, whereby the two connecting points 37, 37a as considered in a projection are drawn towards one another. This means that, in particular, the connections 40, 40.1 as illustrated in FIG. 12 by movement arrows are drawn substantially towards one another, whereby connecting points of the connections 40, 40.1 with the respective adjusting devices 22 of the brakes 11 are drawn or moved towards one another. This drawing together is transmitted to the adjusting device 22 of the brake 11 (see FIG. 6). A force of the force store 31 determines, in this arrangement by way of lever actions of the adjusting device 22 of the brake 11, a pressing force of the brake shoe carriage 13 against the guide rail 6. According to experience this pressing force is approximately 800 Newtons. It can thus be ensured that the brake shoe 15 is when required automatically engaged when the cage 2 is in motion.

Advantageously, lever spacings and lever action lines at the actuating lever 33, i.e. the point of engagement P2 of the force store 31 with respect to the fulcrum P1 of the actuating lever 33 and with respect to the support point P3 of the force store 31 in the housing of the actuator 30 as well as with respect to the connecting points 37, 37a, are so arranged that on actuation of the actuator 30 a tension force which can be substantially constant over an actuation stroke arises in the connections 40. This is achieved, for example, in that a lever spacing, i.e. the force action line determined by the engagement point P2 and the support point P3, from the fulcrum P1 of the actuating lever 33 in the unactuated state is small so that it increases, due to rotation of the actuating lever 33, in the case of actuation. Compensation for a stress relief of the force store 31, for example due to stress relief of the spring store 32, is thus provided by the increase in the lever spacing.

The form of the pawl of the holding device 34, the catch 34a, a holding force of the electromagnet 35 and the force store 31 are moreover advantageously matched to one another in such a manner that when the electromagnet 35 is switched on the actuating lever 33 is held in the closed setting and when the electromagnet 35 is switched off the force store 31 can reliably press back the holding device 34. In a realized application the holding force of the electromagnet is typically approximately 116 Newtons. An electromagnet of that kind requires a low power of merely approximately 2.5 Watts. The braking device can thus be operated with very low energy consumption. Advantageously, the holding device 34 is so constructed that after release it is urged into an open position by, for example, an auxiliary spring. Rebound of the holding device 34 is thereby prevented.

In some cases, the actuator comprises a damping device 38 which acts in damping manner on the movement course during adjustment. The damping device 38—this can be a hydraulic, pneumatic or magnetic damping device—can be set so that it brakes a movement in the end region of the adjustment travel so as to thus damp an end collision of the brake shoe with the rail. Output of noise and also impact loading of the material can thus be reduced. The damping device sometimes acts directly on the actuating lever 33. The damping device 38 can also be integrated in the force store 31.

Figure 13:
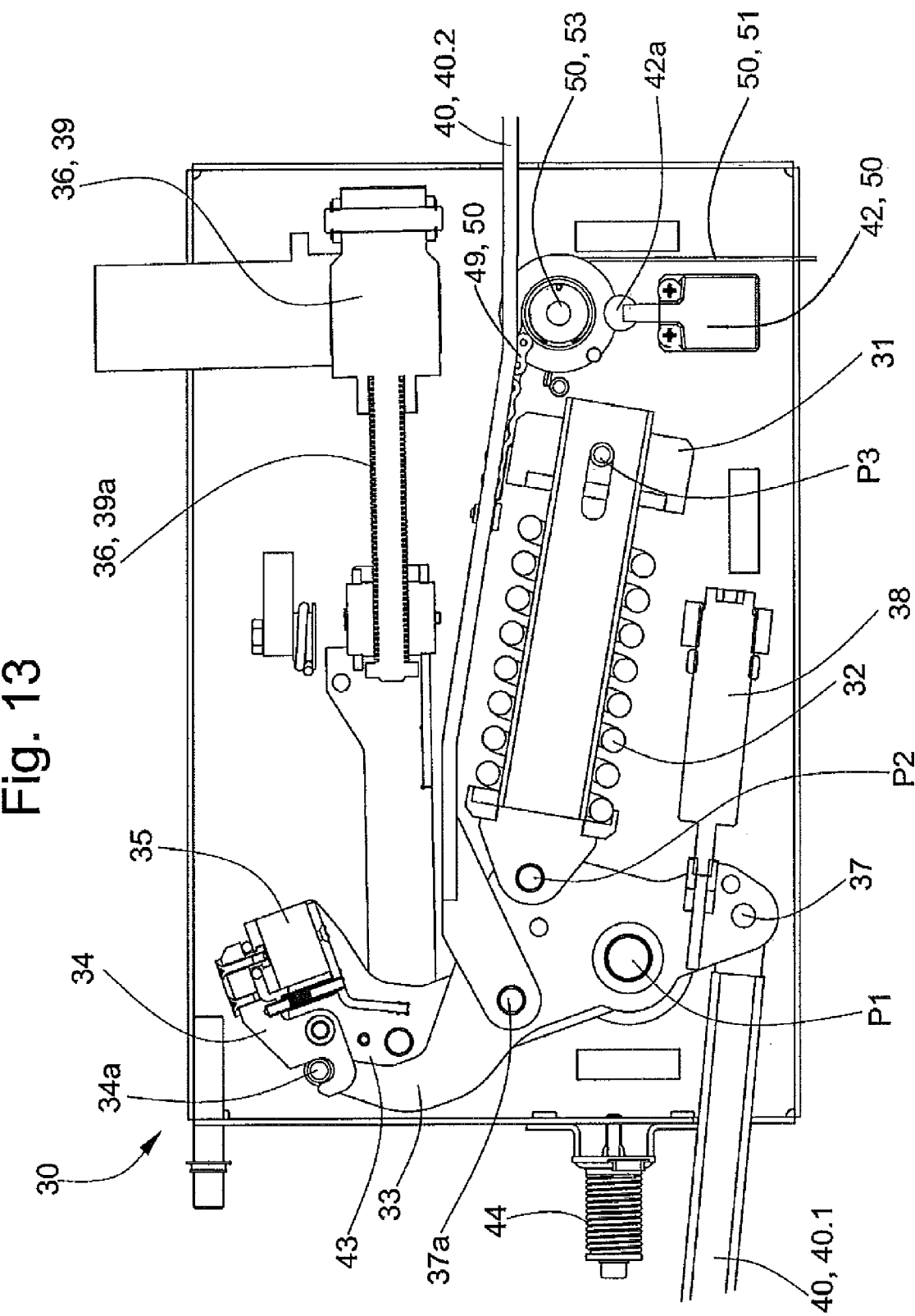
FIG. 13 shows a plan view of the actuator during resetting.

The actuator can, as illustrated in FIG. 13, be tensioned back into its readiness setting after an actuation. This resetting can be carried out automatically, for example by a brake control device, or manually. In the case of automatic resetting, for example, the brake control device or an appropriate safety unit checks—when a travel command is present—the state of the installation and in the case of a correspondingly positive result initializes a resetting command to the actuator. A manual resetting can be required if the brake device has been actuated due to a fault, so as to stop the cage in the case of, for example, an uncontrolled movement. This usually requires the intervention of expert personnel, who then manually perform resetting of the actuator 30, for example by actuation of a switching device or, if for example no electrical energy is available, by means of the emergency unlocking means 50. The switching device can be constructed in the manner that in the event of release of the switching device the braking device is actuated again.

For resetting of the actuator 30 by means of the switching device the actuator 30 has the resetting device 36. The resetting device 36 consists of a spindle drive with geared motor 39, which drives a spindle 39a. The holding device 34 with electromagnet 35 is movable by the spindle 39a. For resetting, the holding device 34 is moved out by means of the spindle 39a, and the pawl of the holding device 34 grips the triggered actuating lever 33 or the catch 34a. The holding device 34 is then held back by the electromagnet 35. Through switching over the geared motor 39 the holding device 34 is now drawn back to the readiness setting by the latched actuating lever 33 (see FIG. 11). The holding device 34 together with the electromagnet 35 is guided by a guide lever 43 into the correct position during the movement with respect to the actuating lever 33. As a result, the electromagnet 35 on reaching the actuating lever 33 can be switched on, whereby the holding device 34 grips the actuating lever and holds it by means of the catch 34a. It is ensured by this arrangement that the actuator 30 can be directly actuated again at any time, even during resetting.

The course of the resetting or the movement course of the geared motor 39 is controlled by switches 41. A first switch 41a recognizes, in the example, the setting of the holding device 34. If the electromagnet 35 has pulled up the holding device 34, the first switch 41a is disposed in closed state. A second switch 41b recognizes a position of the geared motor 39 or of the spindle 39a, which corresponds with the operating position. In the readiness setting of the actuator 30 in correspondence with FIGS. 10 and 11 both switches 41a, 41b are thus closed. If the actuator 30 is actuated, the holding device 34 opens and frees the actuating lever 33. The first switch 41a opens at the same time. An opened first switch 41a with second switch 41b closed at the same time means that the actuator 30 is actuated. For the resetting, the spindle 39a is, as already described, moved out until the holding device 34 can be pulled up. This is established by the first switch 41a, whereby the geared motor 39 is reversed and thus the holding device 34 with latched actuating lever 33 is drawn back into the readiness setting. As soon as the second switch 41b is closed, this means that the readiness setting has been reached and the geared motor 39 is switched off. The geared motor 39 with the spindle 39a is constructed to be self-locking. The positioning of the holding device 34 with latched actuating lever 33 is thus determined by the resetting device 36 itself.

The arrangement of the switches 41 also makes possible a secure movement course, for example after an interruption of current, during the setting. If, for example, at the time of placing in operation both switches 41 are opened after an interruption in current, the geared motor 39 is initially driven back into the operating position. Insofar as a safety monitoring means now issues a corresponding readiness signal, but in that case the first switch 41 is still open as before, the resetting of the actuator 30 can automatically takes place in correspondence with the process described in the foregoing or can be initialized.

The operating settings of the actuator itself can also be monitored by further switches (not illustrated), so that control devices have appropriate state data.

The actuator 30 apparent in FIGS. 10 to 13 as well as in FIG. 1 has an optional emergency unlocking means 50. This emergency unlocking means 50 enables resetting of the actuator 30 in such a manner that a possible manual relaxation of stress of a blocked elevator cage 2 is made possible. In the example the second connection 40.2 is connected by means of a pull chain 49 with a cable drum 53. The cable drum 53 is connected by way of the cable pull 51 with the hand crank 52 (see FIG. 1). The hand crank 52 in the example is arranged on a roof of the cage 2 in the vicinity of a front shaft wall. In the case of need, the cable drum 53 can be rotated by way of the hand crank 52, which for this purpose can be plugged onto a corresponding cable pull winder, so that the pull chain 49 connected with the cable drum 52 draws back the actuating lever 33 by way of the second connection 40.2. The actuator 30 can thus be reset at least to such an extent that the brakes 11, 11a are released and the cage 2 can thereby be relieved of stress, i.e. moved out of a blocked braking setting. After this emergency unlocking the hand crank 52 is relieved of load again, whereby the cable drum 53 is rotated back, advantageously by means of a spring integrated in the cable drum 53, so that the pull chain 49 is relieved. The setting of the cable drum is advantageously monitored by a third switch 42.

Figure 10:
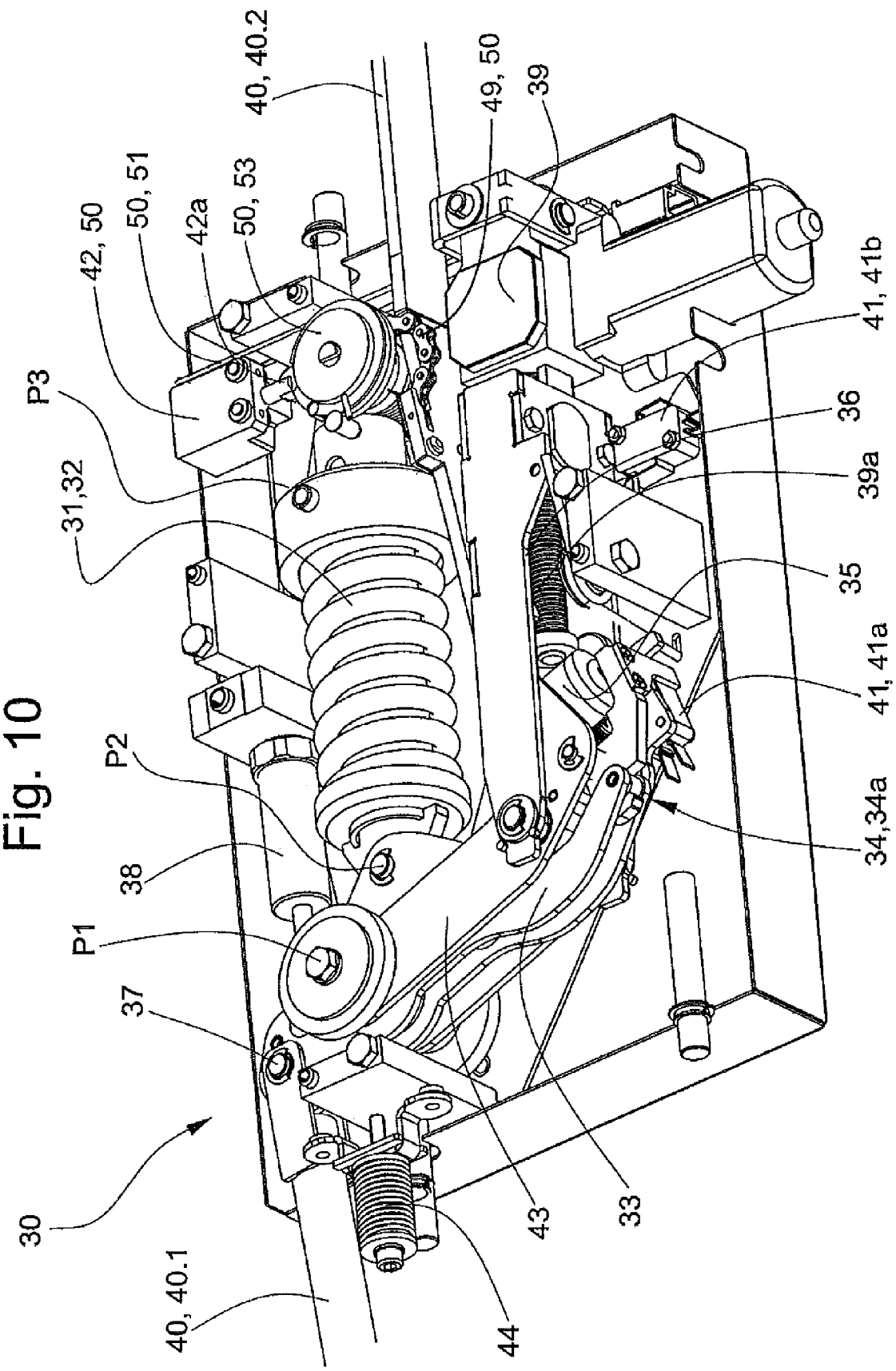
FIG. 10 shows a perspective individual view of an actuator.

In the unactuated setting of the actuator 30, as illustrated in FIGS. 10 and 11, the cable drum 53 is rotated back and the pull cable 51 and also the pull chain 49 are relieved of load. The pull chain 49 is loose, so that it does not obstruct actuation of the actuator 30. The third switch 42 is not actuated, which means that the emergency unlocking means 50 is not actuated.

In FIGS. 12 and 13 the actuator 30 is actuated. Correspondingly, the pull chain 49 of the emergency unlocking means is substantially tensioned. If required, the connection 40.2 can be tightened by drawing the cable pull 51. On rotation of the cable drum 53 a switch plunger 42a of the switch 42 is pressed back. An electrical operation of the elevator installation is then, for example, interrupted until the cable drum 53 is relieved of load again.

Figure 14:
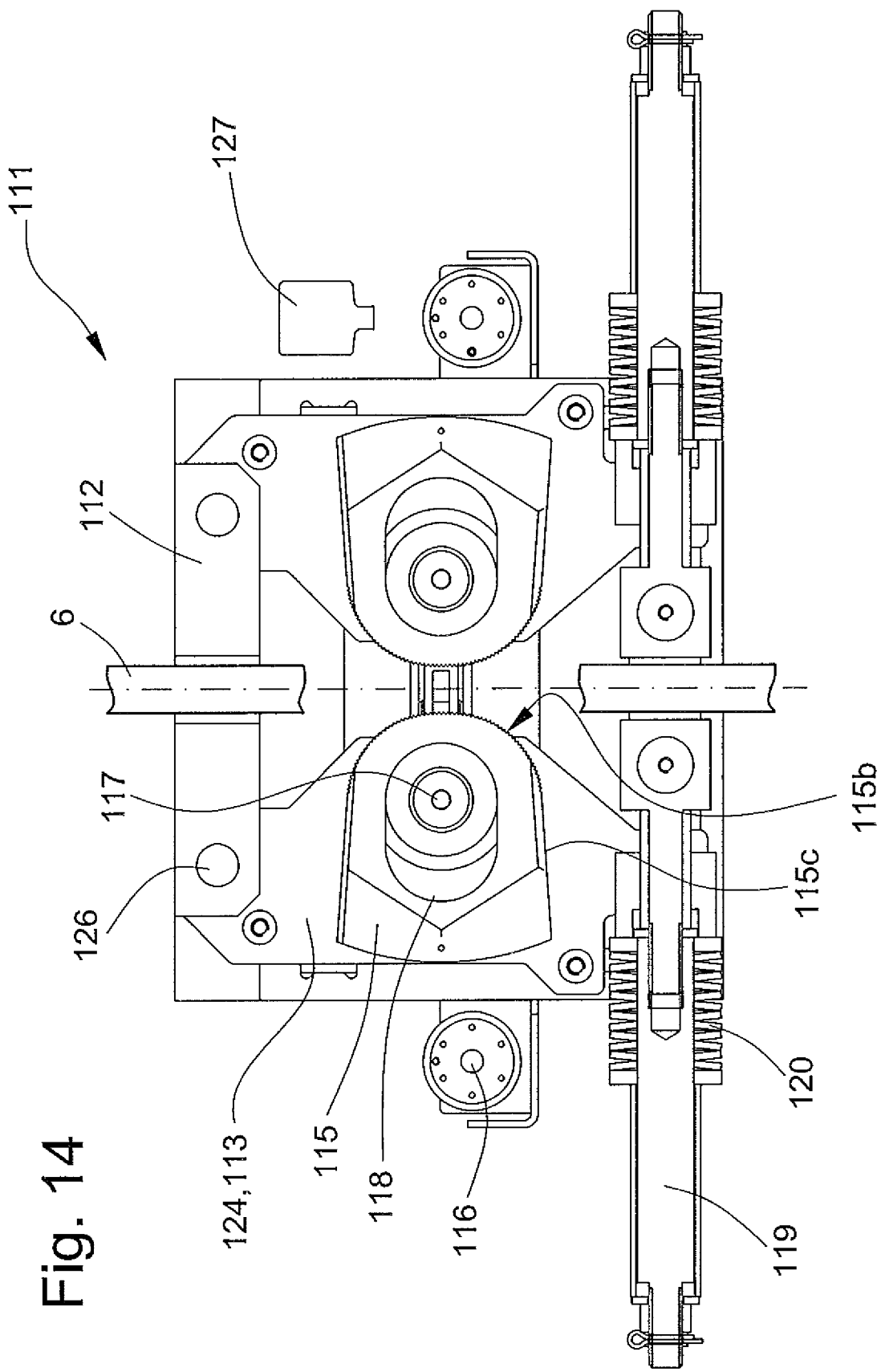
FIG. 14 shows a further example of a brake.
Figure 15:
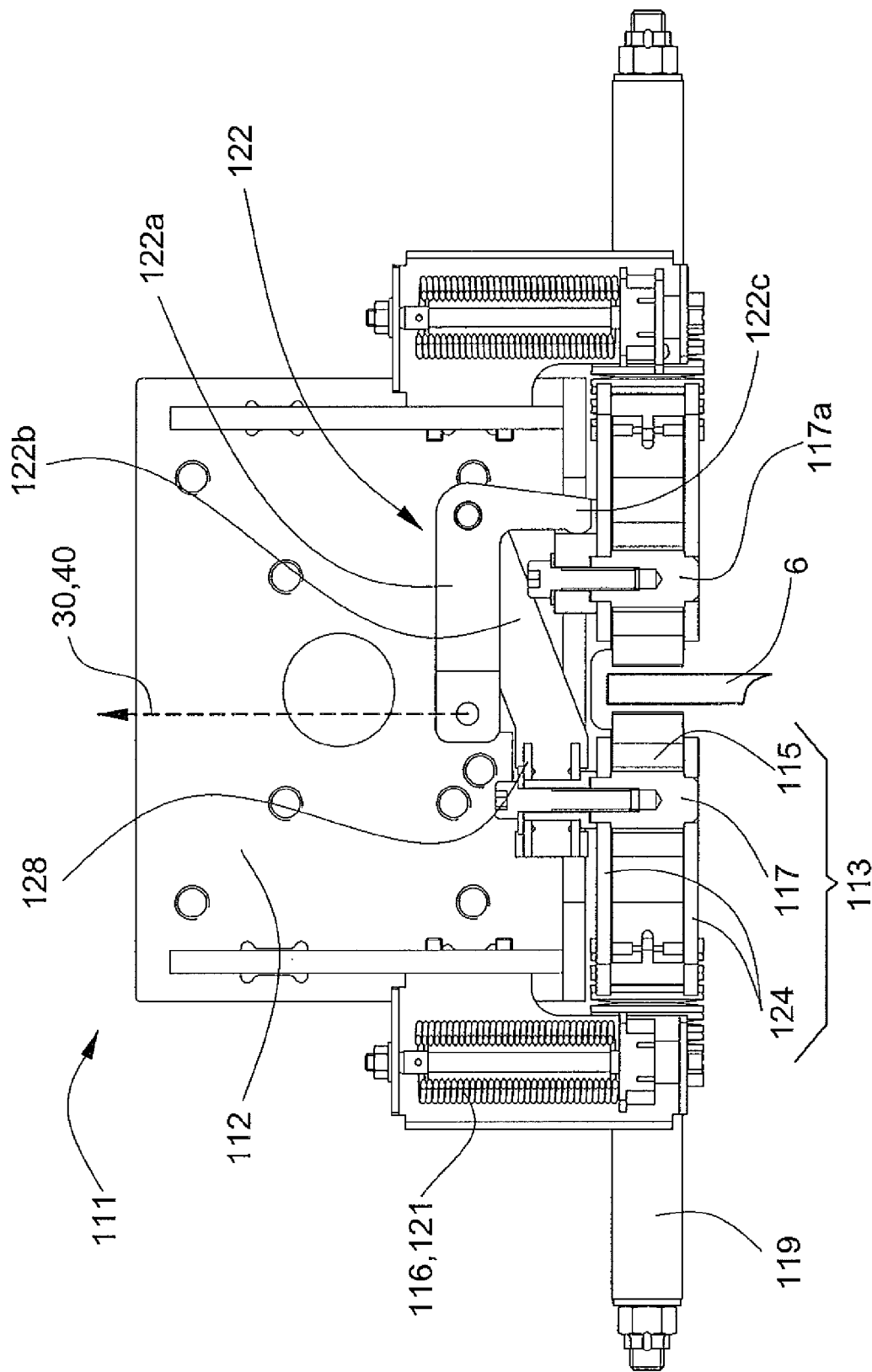
FIG. 15 shows sectional view from the top of the brake of FIG. 14.
Figure 16:
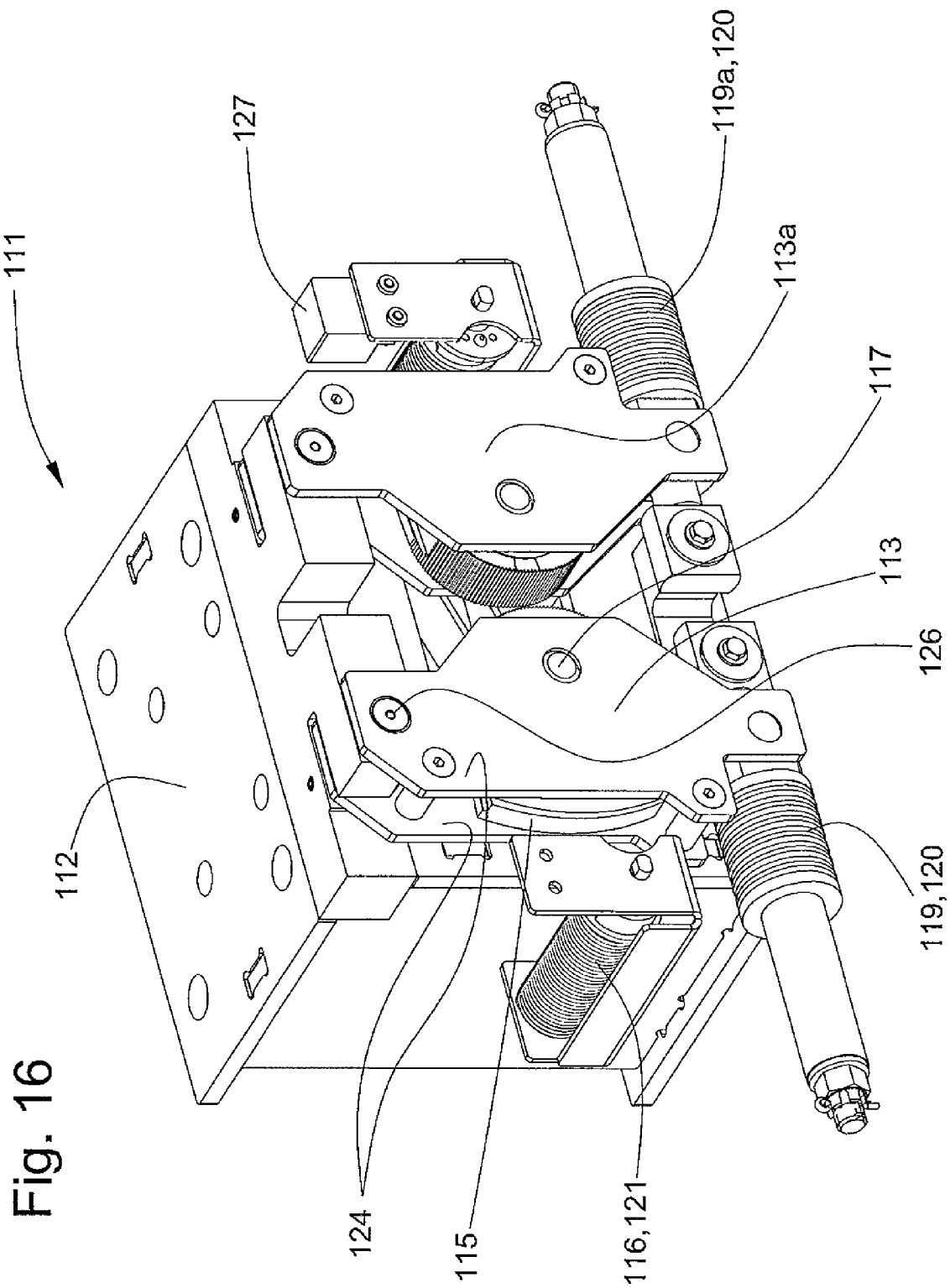
FIG. 16 shows a perspective view of the brake of FIG. 14.

In an alternative embodiment of the brake according to FIGS. 14 to 16 the brake shoe holder is constructed as a brake shoe lever 113. The essential functions correspond with the explanations with respect to the exemplifying embodiment according to FIGS. 4 to 9. The brake shoe lever 113 is used instead of the brake carriage. The brake shoe lever 113 is arranged in a brake housing 112 to be pivotable about a horizontal pivot axis 126 and a brake shoe 115 is mounted in this brake shoe lever. A retraction device 116 pulls the brake shoe lever 113, analogously to the brake shoe carriages in the previous examples, away from the guide rail 6. The brake shoe lever 113 together with the brake shoe 115 can be adjusted when required with respect to the guide rail 6 by means of adjusting device 122. The brake shoe 115 has, as explained in the preceding examples, a first sub-region 115a and a connecting second sub-region 115b. The brake shoe lever 113 is supported in its lower region in the housing 112 by a compression spring group 119, whereby in a case of rotation or displacement of the brake shoe 115 bearing against the guide rail a corresponding pressing force is built up by way of the first and second sub-regions 115a, 115b. The illustrated brake is of substantially symmetrical construction. This means that a respective brake shoe lever 113, 113a is arranged on either side of the guide rail 6. In the example, one of the retraction devices is provided with a monitoring switch 127 for monitoring the working position of the brake shoe 115 or of the brake shoe lever 113. In case of need, the brake shoes 115 or the brake shoe levers 113, 113a are adjusted by means of the adjusting device 122. The adjusting device 122 is for that purpose actuated, for example by an actuator 30, via connections 40 (see FIG. 15). The actuator 30 engages a first lever 122a of the adjusting device 122. The first lever 122a is connected with a second lever 122b by way of a fulcrum. The second lever 122b can be pivotably connected with a bearing axle 117. The first lever 122a presses by a knee 122c against a second bearing axle 117a of the second brake shoe 115a. The two bearing axles 117, 117a and thus the two brake shoes levers 113, 113a together with the brake shoes 115, 115a are thereby displaced relative to one another and pressed against the guide rail 6. This function of adjustment is also used analogously in the brake according to FIGS. 4 to 9 and it is also suitable for co-operation with the actuator 30 according to FIGS. 10 to 13.

With knowledge of the disclosed technologies, the elevator expert can change the set shapes and arrangements as desired. For example, instead of the illustrated symmetrical arrangement with two brake shoe carriages 13, 13a, 113, 113a and two compression spring groups 19, 19a, 119, 119a it is also possible to make use of a compression spring group 19, 119 arranged at only one side, whilst the other side is, for example, rigidly supported, or a rigidly supported brake shoe carriage 13, 113 can be supported on a compression spring group 19a opposite a fixed brake plate 14. An embodiment of that kind is illustrated in FIG. 5b. A brake shoe carriage 13 is arranged on one side at the left in the figure and a fixed brake plate is arranged on the opposite side on the right in the figure. The brake shoe carriage 13 can be pressed against the guide rail by means of an adjusting device, whereby the actuation sequence, as already illustrated in the foregoing, results. However, by contrast with the symmetrical arrangement the entire brake housing is now displaced by the geometry of the brake shoe, whereby the fixed brake plate is drawn against the rail. The fixed brake plate is mounted by way of compression spring groups 19 so that in the case of corresponding spring compression, which is determined by the geometry of the brake shoe, a predetermined pressing force results.

In addition, the parts preferably used in the description of the actuator 30, such as pull chain and pull cable, can be replaced by the expert with equivalent parts, such as other tension or possibly pressure means, or use can be made of appropriate lever systems instead of cable drums and winders. In addition, the values mentioned in the description, such as, for example, the holding force of the electromagnet, etc., are informational. They are fixed by the expert with consideration of the selected materials and shapes.

Alternatively, for example, the connections 40, 40.1 can also be drawn towards one another in that a lever system in the form of a rhombus is used. In that case a force store urges when required two oppositely disposed corner points of the rhombus away from one another, whereby the two remaining corner points of the rhombus are necessarily drawn together. The connections 40, 40.1 are in that case coupled to these two other corner points of the rhombus.

Having illustrated and described the principles of the disclosed technologies, it will be apparent to those skilled in the art that the disclosed embodiments can be modified in arrangement and detail without departing from such principles. In view of the many possible embodiments to which the principles of the disclosed technologies can be applied, it should be recognized that the illustrated embodiments are only examples of the technologies and should not be taken as limiting the scope of the invention. Rather, the scope of the invention is defined by the following claims and their equivalents. I therefore claim as my invention all that comes within the scope and spirit of these claims.

I claim:

1. An elevator cage brake for braking on a guide rail comprising:
a brake housing;
a brake shoe having a first sub-region and a second sub-region; and
a brake shoe support having a bearing axle on which the brake shoe is arranged, wherein the first sub-region is rotatable about the bearing axle, and wherein the second sub-region is longitudinally and transversely displaceable relative to the bearing axle, the brake shoe support being mounted in the brake housing for displacement of both the brake shoe support and the bearing axle relative to the brake housing between a readiness setting with the brake shoe spaced from the guide rail and an engagement setting with the brake shoe engaged with the guide rail, and wherein the brake shoe is longitudinally displaceable in the brake housing after rotation of the first sub-region on the bearing axle.

2. The elevator cage brake of claim 1, further comprising a plurality of compression springs, the plurality of compression springs being biased to a biasing force, wherein the brake shoe support is positioned by a retraction device to bear against the plurality of compression springs.

3. The elevator cage brake of claim 1, further comprising a retraction device, the retraction device being configured to hold at least one of the brake shoe and the brake shoe support in a readiness position when the brake is in an unactuated state.

4. The elevator cage brake of claim 3, wherein the retraction device comprises a spring device configured to engage the brake shoe, and wherein the spring device is configured to draw the brake shoe and the brake shoe support into the readiness position.

5. The elevator cage brake of claim 1, further comprising an adjusting device configured to displace the brake shoe support from a readiness position to an engaged position.

6. The elevator cage brake of claim 1, further comprising a fixed brake plate configured opposite the brake shoe support, wherein the brake shoe and the fixed brake plate are configured to receive a guide rail.

7. The elevator cage brake of claim 1, wherein the brake shoe is a first brake shoe, the elevator cage brake further comprising:
a second brake shoe; and
respective brake shoe supports configured to support the first and second brake shoes in opposing positions, wherein the elevator cage brake is configured to receive a guide rail between the first and second brake shoes.

8. The elevator cage brake of claim 1, wherein the first sub-region has a substantially arcuate shape and the second sub-region has a substantially rectilinear shape.

9. The elevator cage brake of claim 1, wherein the first sub-region comprises a curved region, the curved region having a center and having first and second extremities, the curved region also having a width, the width increasing from the center to the first and second extremities, and wherein the second sub-region comprises a rectilinear region, the rectilinear region having a middle portion, an upper portion and a lower portion, the upper portion being wider than the middle and lower portions.

10. An elevator cage brake for braking on a guide rail comprising:
a brake housing;
a brake shoe having a first sub-region and a second sub-region:
a brake shoe support having a bearing axle on which the brake shoe is arranged, wherein the first sub-region is rotatable about the bearing axle, and wherein the second sub-region is longitudinally and transversely displaceable relative to the bearing axle, the brake shoe support being mounted in the brake housing for displacement of both the brake shoe support and the bearing axle between a readiness setting with the brake shoe spaced from the guide rail and an engagement setting with the brake shoe engaged with the guide rail; and
wherein the brake shoe further comprises the second sub-region having two portions with respective rectilinear forms, the first sub-region having a curved shape with first and second extremities, the second sub-region rectilinear portions being connected to associated ones of the first extremity of the curved shape and the second extremity of the curved shape, the second sub-region rectilinear portions having respective widths, each of the respective widths increasing as each of the second sub-region rectilinear portions extend away from the associated first and second extremities of the curved shape.

11. An elevator braking method, comprising:
moving an elevator brake shoe support including both a brake shoe and a bearing axle from a readiness position to an engagement position;
engaging an elevator guide rail with the brake shoe with at least a portion of a first sub-region of the brake shoe, the elevator brake shoe being coupled to the elevator brake shoe support, the elevator brake shoe support being coupled to an elevator car;
rolling at least part of the first sub-region of the brake shoe along at least a portion of the elevator guide rail;
moving the elevator brake shoe support away from the elevator guide rail;
engaging the elevator guide rail with a second sub-region of the brake shoe;
vertically displacing the brake shoe relative to the elevator brake shoe support; and
further moving the elevator brake shoe support away from the elevator guide rail.

12. An elevator installation comprising:
an elevator cage;
at least one guide rail; and
a brake being coupled to the elevator cage for braking on the at least one guide rail, the brake comprising
a brake housing,
a brake shoe having a first sub-region and a second sub-region, and
a brake shoe support having a bearing axle on which the brake shoe is arranged, wherein the first sub-region is rotatable about the bearing axle, and wherein the second sub-region is longitudinally and transversely displaceable relative to the bearing axle, the brake shoe support being mounted in the brake housing for displacement of both the brake shoe support and the bearing axle relative to the brake housing between a readiness setting with the brake shoe spaced from the at least one guide rail and an engagement setting with the brake shoe engaged with the at least one guide rail, and wherein the brake shoe is longitudinally displaceable in the brake housing after rotation of the first sub-region on the bearing axle.

* * * * *